(12) United States Patent
Nagatani et al.

(10) Patent No.: US 9,715,205 B2
(45) Date of Patent: Jul. 25, 2017

(54) IMAGE FORMING APPARATUS REMOTELY OPERATED BY EXTERNAL TERMINAL AND METHOD OF GENERATING, TRANSMITTING AND DISPLAYING COMPOSITE IMAGES

(71) Applicant: KONICA MINOLTA, INC., Chiyoda-ku (JP)

(72) Inventors: Kentaro Nagatani, Toyokawa (JP); Takao Kurohata, Hino (JP); Junichi Isamikawa, Toyokawa (JP); Shinichi Asai, Gamagori (JP); Yusuke Shinosaki, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/065,997

(22) Filed: Oct. 29, 2013

(65) Prior Publication Data

US 2014/0126017 A1    May 8, 2014

(30) Foreign Application Priority Data

Nov. 2, 2012    (JP) .................................. 2012-242711

(51) Int. Cl.
*G06F 3/0488* (2013.01)
*G06F 3/147* (2006.01)
(Continued)

(52) U.S. Cl.
CPC ..... *G03G 15/5016* (2013.01); *H04N 1/00411* (2013.01); *H04N 1/00466* (2013.01);
(Continued)

(58) Field of Classification Search
None
See application file for complete search history.

(56) References Cited

U.S. PATENT DOCUMENTS

2007/0109561 A1*    5/2007    Suzue ........................... 358/1.1
2007/0109578 A1    5/2007    Suzue
(Continued)

FOREIGN PATENT DOCUMENTS

JP    2002-281195    9/2002
JP    2007-140758    6/2007
(Continued)

OTHER PUBLICATIONS

Notification of Reasons for Refusal issued in corresponding Japanese Patent Application No. 2012-242711, mailed Oct. 21, 2014, and English translation thereof.
(Continued)

*Primary Examiner* — Benny Q Tieu
*Assistant Examiner* — Haris Sabah
(74) *Attorney, Agent, or Firm* — Buchanan Ingersoll & Rooney PC

(57) ABSTRACT

An image forming apparatus remotely operated by an external terminal includes a generation unit that generates a first composite image by combining a first image and a second image such that the second image is displayed within and over the first image, the first image being an operation screen image corresponding to an operation screen of the image forming apparatus, and the second screen being an image of an area including hardware key images corresponding to hardware keys of the image forming apparatus, a transmission unit that transmits first image data that is image data of the first composite image to the external terminal as data for displaying a remote operation image for the image forming apparatus, and a reception unit that receives, from the external terminal, first manual input information on manual input to the first composite image displayed as the remote operation image on the external terminal.

25 Claims, 22 Drawing Sheets

(51) Int. Cl.
  *G03G 15/00* (2006.01)
  *H04N 1/00* (2006.01)
(52) U.S. Cl.
  CPC ..... *H04N 1/00474* (2013.01); *H04N 1/00482* (2013.01); *H04N 1/00501* (2013.01); *H04N 1/00973* (2013.01); *G03G 15/5075* (2013.01)

(56) References Cited

U.S. PATENT DOCUMENTS

2012/0182432 A1\* 7/2012 Okamoto et al. .......... 348/207.1
2012/0224198 A1\* 9/2012 Kawabata et al. ............. 358/1.9

FOREIGN PATENT DOCUMENTS

| JP | 2008-071313 A | 3/2008 |
| JP | 2012-068709 A | 4/2012 |
| JP | 2012-089068 A | 5/2012 |

OTHER PUBLICATIONS

Notification of Reasons for Refusal issued in corresponding Japanese Patent Application No. 2012-242711, mailed Jan. 20, 2015, and English translation thereof (6 pages).

\* cited by examiner

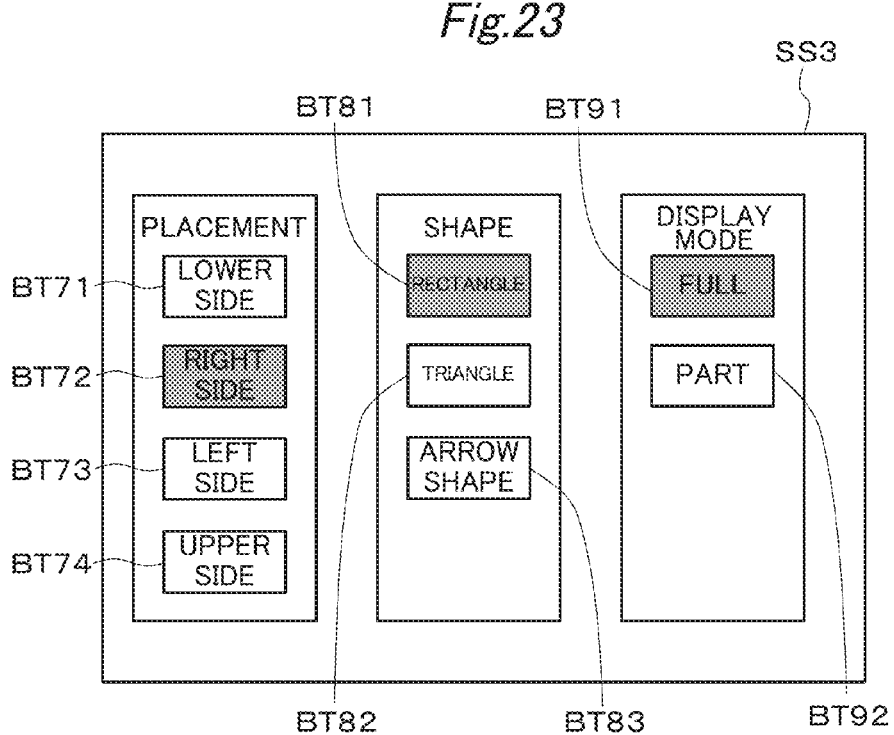

IMAGE FORMING APPARATUS REMOTELY OPERATED BY EXTERNAL TERMINAL AND METHOD OF GENERATING, TRANSMITTING AND DISPLAYING COMPOSITE IMAGES

This application is based on Japanese Patent Application No. 2012-242711 filed on Nov. 2, 2012, the contents of which are hereby incorporated by reference.

BACKGROUND OF THE INVENTION

Technical Field

The present invention relates to a technique for remotely operating an image forming apparatus and a technique related thereto.

Related Art

Remote operation technology includes a technique for remotely operating a remote operation apparatus by causing a remotely located apparatus to display a remote operation image used for remote operation of the remote operation apparatus.

For example, Japanese Patent Application Laid-Open No. 2008-071313 (Patent Document 1) discloses a technique for remotely operating a remote operation apparatus by causing a remotely located PC to display on its display a remote operation image used for remote operation of the remote operation apparatus. In particular, with the technique of Patent Document 1, an image generated by combining a screen image (panel screen image) and a hardware key image that are disposed in horizontal line is displayed as a remote operation image on the display of the remotely located PC, the screen image being displayed on a touch panel of the remote operation apparatus and the hardware key image showing the external view of hardware keys of the remote operation apparatus. This allows a user to remotely operate not only the touch panel of the remote operation apparatus but also the hardware keys of the remote operation apparatus via the remote operation image.

Meanwhile, there is a technique for remotely operating an image forming apparatus, using a remotely located apparatus such as an external terminal. By applying the aforementioned technique of Patent Document 1 to this technique, an image generated by combining the panel screen image and hardware key image of the image forming apparatus that are disposed inline can be used as a remote operation image. Thus, even the technique for remotely operating an image forming apparatus makes it possible to remotely operate not only the touch panel of the image forming apparatus but also the hardware keys of the image forming apparatus.

It is however noted that the remote operation image is, as described above, an image generated by combining the panel screen image and hardware key image of the image forming apparatus that are disposed inline. From this, the data capacity of image data of the remote operation image is relatively large because it corresponds to the total value of the data capacity of image data of the panel screen image and the data capacity of image data of the hardware key image. The image data with such a relatively large data capacity can cause a delay during transmission from the image forming apparatus to the external terminal and accordingly a reduction in the operability of the image forming apparatus during remote operations.

SUMMARY OF THE INVENTION

It is an object of the present invention to provide a technique that can reduce the possibility of degraded operability of an image forming apparatus during remote operations.

According to a first aspect of the present invention, an image forming apparatus remotely operated by an external terminal includes a generation unit configured to generate a first composite image by combining a first image and a second image such that the second image is displayed within and over the first image, the first image being an operation screen image corresponding to an operation screen of the image forming apparatus, and the second image being an image of an area that includes a hardware key image corresponding to a hardware key of the image forming apparatus, a transmission unit configured to transmit first image data that is image data of the first composite image to the external terminal as data for displaying a remote operation image used for remote operation of the image forming apparatus, and a reception unit configured to receive first manual input information from the external terminal, the first manual input information being information on manual input to the first composite image displayed as the remote operation image on the external terminal.

According to a second aspect of the present invention, a control method for controlling an image forming apparatus remotely operated by an external terminal includes the steps of a) generating a first composite image by combining a first image and a second image such that the second image is displayed within and over the first image, the first image being an operation screen image corresponding to an operation screen of the image forming apparatus, and the second image being an image of an area that includes a hardware key image corresponding to a hardware key of the image forming apparatus, b) transmitting first image data that is image data of the first composite image to the external terminal as data for displaying a remote operation image used for remote operation of the image forming apparatus, and c) receiving first manual input information from the external terminal, the first manual input information being information on manual input to the first composite image displayed as the remote operation image on the external terminal.

According to a third aspect of the present invention, a non-transitory computer-readable recording medium that records a program for causing a computer built into an image forming apparatus remotely operated by an external terminal to execute the steps of a) generating a first composite image by combining a first image and a second image such that the second image is displayed within and over the first image, the first image being an operation screen image that corresponds to an operation screen of the image forming apparatus, and the second image being an image of an area that includes a hardware key image corresponding to a hardware key of the image forming apparatus, b) transmitting first image data that is image data of the first composite image to the external terminal as data for displaying a remote operation image used for remote operation of the image forming apparatus, and c) receiving first manual input information from the external terminal, the first manual input information being information on manual input to the first composite image displayed as the remote operation image on the external terminal.

According to a fourth aspect of the present invention, an image forming system includes an image forming apparatus and an external terminal configured to remotely operate the image forming apparatus. The image forming apparatus includes a generation unit configured to generate a first composite image by combining a first image and a second image such that the second image is displayed within and over the first image, the first image being an operation screen image that corresponds to an operation screen of the image forming apparatus, and the second image being an image of an area that includes a hardware key image corresponding to a hardware key of the image forming apparatus, a first transmission unit configured to transmit first image data that is image data of the first composite image to the external terminal as data for displaying a remote operation image used for remote operation of the image forming apparatus, and a first reception unit configured to receive manual input information on manual input to the remote operation image from the external terminal. The external terminal includes a second reception unit configured to receive the first image data, an input/output control unit configured to display the first composite image based on the first image data as the remote operation image on a display unit and accept manual input to the remote operation image, and a second transmission unit configured to transmit manual input information on manual input to the remote operation image toward the image forming apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 23 illustrates an operation screen displayed on the image forming apparatus.

DETAILED DESCRIPTION OF THE PREFERRED EMBODIMENTS

Hereinafter, embodiments of the present invention will be described with reference to the drawings.

1. Overall Configuration

Figure 1:
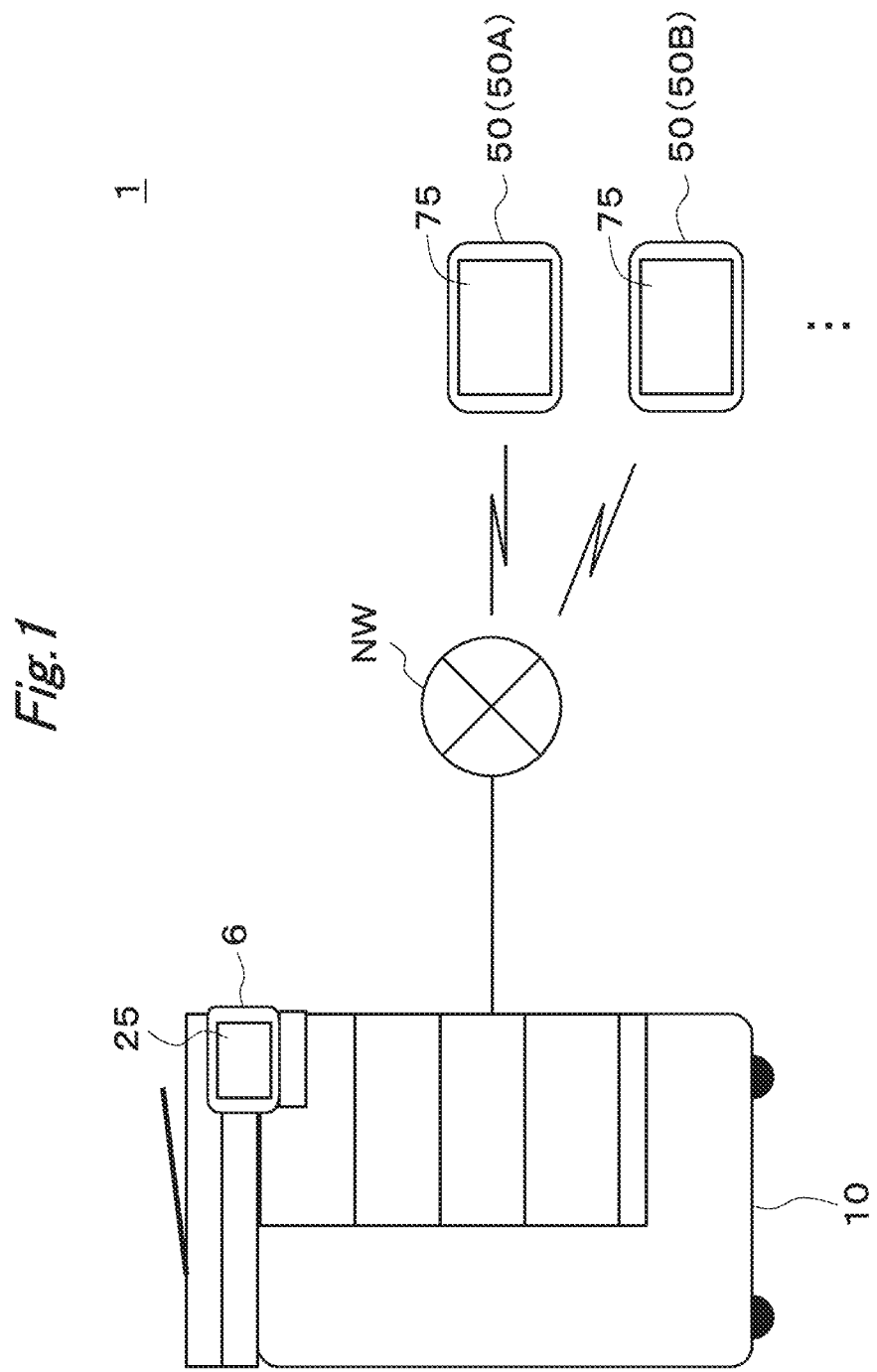
FIG. 1 illustrates a schematic configuration of an image forming system.

FIG. 1 illustrates an image forming system 1. As shown in FIG. 1, the image forming system 1 includes an image forming apparatus 10 and external terminals 50 (e.g., 50A and 50B).

The image forming apparatus 10 and the external terminals 50 are connected to each other via a network NW. The network NW is configured by, for example, a local area network (LAN) and the Internet. The form of connection to the network NW may be either wired or wireless. For example, the image forming apparatus 10 is connected by wire to the network NW, whereas the external terminals 50 (e.g., 50A and 50B) are wirelessly connected to the network NW.

In the image forming system 1, the external terminals 50 can be used to perform various types of operations on the image forming apparatus 10. In other words, the external terminals 50 can remotely operate the image forming apparatus 10.

Specifically, data for displaying an image used for remote operation of the image forming apparatus 10 (hereinafter, also referred to as a "remote operation image ROI") is transmitted from the image forming apparatus 10 to an external terminal 50. Then, the remote operation image ROI based on the display data is displayed on a touch panel 75 of the external terminal 50. This allows a user of the external terminal 50 to remotely operate the image forming apparatus 10 via the remote operation image ROI.

2. Configuration of Image Forming Apparatus 10

Figure 2:
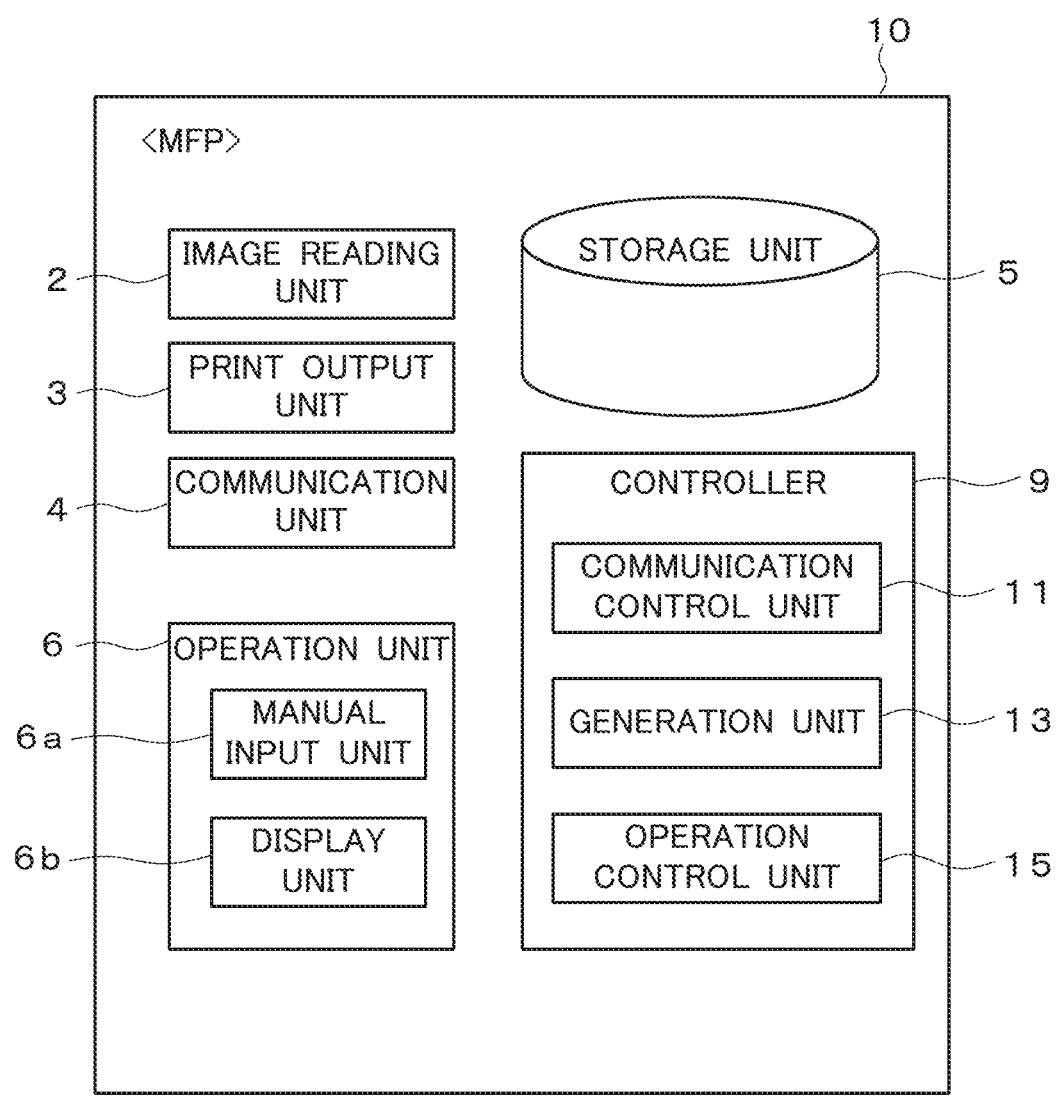
FIG. 2 is a functional block diagram of an image forming apparatus.

FIG. 2 is a functional block diagram of the image forming apparatus 10. Here, a Multi-Functional Peripheral (MFP) is given as an example of the image forming apparatus 10. The functional blocks of the MFP 10 are shown in FIG. 2.

The MFP 10 is an apparatus (also referred to as the "Multi-Functional Peripheral") having functions such as a scan function, a copy function, a facsimile function, and a box storage function. Specifically, the MFP 10 includes, for example, an image reading unit 2, a print output unit 3, a communication unit 4, a storage unit 5, an operation unit 6, and a controller 9 as shown in the functional block diagram of FIG. 2. The MFP 10 implements various types of functions by operating these units in combination.

The image reading unit 2 is a processing unit configured to optically read (i.e., scan) an original document placed at a predetermined position on the MFP 10 and generate image data of the original document (also referred to as an "original image" or a "scanned image"). The image reading unit 2 is also referred to as a "scan unit."

The print output unit 3 is an output unit configured to print out an image on various types of media such as paper on the basis of data to be printed.

The communication unit 4 is a processing unit capable of facsimile communication via a public network or the like. The communication unit 4 is also capable of network communication via the network NW. The network communication uses, for example, various types of protocols such as the transmission control protocol/internet protocol (TCP/

IP). Using the network communication allows the MFP 10 to exchange various types of data with desired apparatuses (e.g., the external terminals 50).

The storage unit 5 is configured by a storage device such as a hard disk drive (HDD). The storage unit 5 stores data regarding a print job, for example. The storage unit 5 also stores the terminal ID of an external terminal 50 that has established a connection with the MFP 10.

The operation unit 6 includes a manual input unit 6a configured to accept manual input to the MFP 10, and a display unit 6b configured to display and output various types of information. The MFP 10 is provided with a touch screen 25 (see FIG. 1) configured by embedding piezoelectric sensors or the like in a liquid crystal display panel. The touch screen 25 functions as part of the manual input unit 6a and also functions as part of the display unit 6b.

The controller 9 is a control unit built into the MFP 10 and configured to perform overall control of the MFP 10. The controller 9 is configured as a computer system that includes, for example, a CPU and various types of semiconductor memories (a RAM and a ROM). The controller 9 implements various types of processing units by causing the CPU to execute a predetermined software program (hereinafter, also simply referred to as a "program") PG1 stored in a ROM (e.g., an EEPROM). Note that the program (specifically, a group of program modules) PG1 may be installed on the MFP 10 using a portable recording medium such as a USB memory (in other words, various types of computer-readable non-transitory recording media) or via the network NW or the like.

Specifically, the controller 9 implements various types of processing units including the communication control unit 11, the generation unit 13, and the operation control unit 15 as shown in FIG. 2 by executing the program PG1.

The communication control unit 11 is a processing unit configured to control communication with other apparatuses (e.g., the external terminals 50). Specifically, the communication control unit 11 includes a transmission unit and a reception unit. The transmission unit is configured to transmit the data for displaying the remote operation image ROI to an external terminal 50. The reception unit is configured to receive manual input information PJ on manual input to the remote operation image ROI.

The generation unit 13 is a processing unit configured to generate the remote operation image ROI.

The operation control unit 15 is a processing unit configured to control various types of operations such as a printout operation and a scan operation performed by the MFP 10.

3. Configuration of External Terminal 50

Next is a description of the configuration of the external terminals 50.

The external terminals 50 are information input/output terminal apparatuses capable of network communication with other apparatuses. Here, tablet terminals are given as an example of the external terminals 50. It is, however, noted that the present invention is not limited to this example, and the external terminals 50 may be other apparatuses such as smartphones or personal computers. The external terminals 50 may be portable apparatuses or stationary apparatuses.

Figure 3:
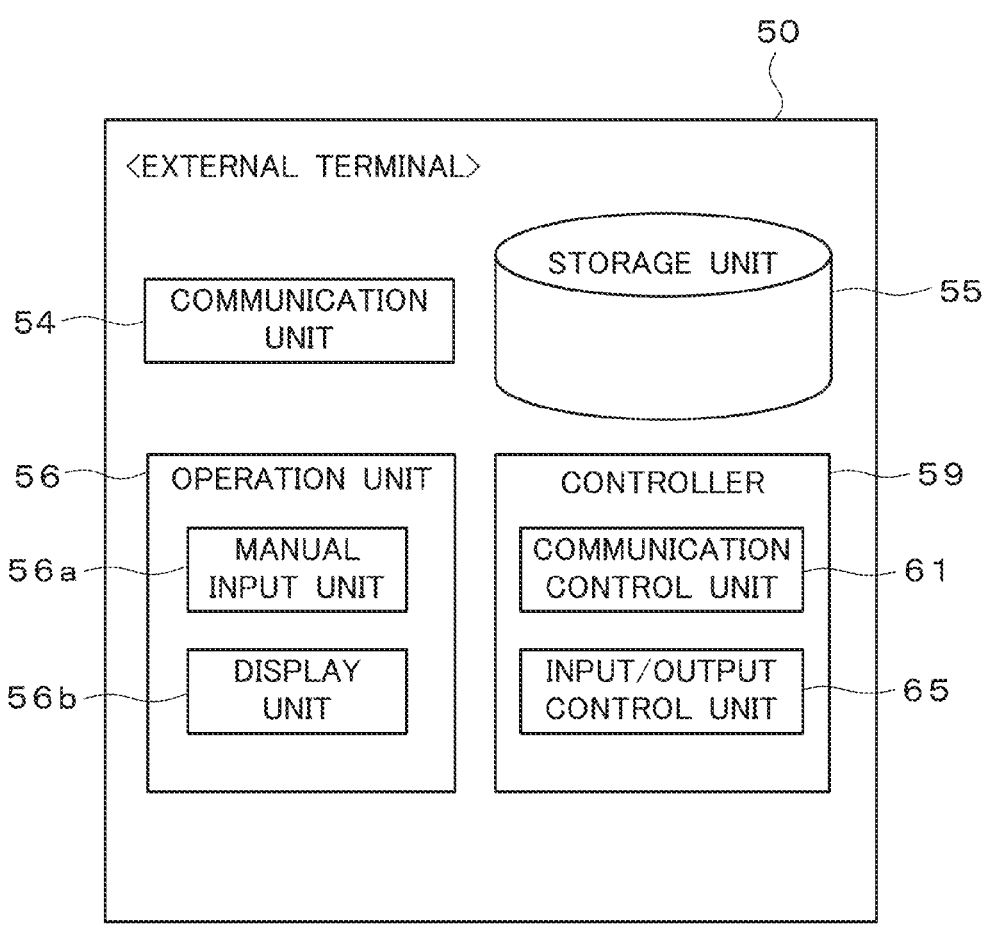
FIG. 3 is a functional block diagram showing a schematic configuration of an external terminal.

FIG. 3 is a functional block diagram showing a schematic configuration of an external terminal 50.

The external terminals 50 each include, for example, a communication unit 54, a storage unit 55, an operation unit 56, and a controller 59 as shown in the functional block diagram of FIG. 3. The external terminals 50 implement various types of functions by operating these units in cooperation.

The communication unit 54 is capable of network communication via the network NW. The network communication uses, for example, various types of protocols such as the transmission control protocol/internet protocol (TCP/IP). Using the network communication allows the external terminals 50 to exchange various types of data with a desired apparatus (e.g., the image forming apparatus 10).

The storage unit 55 is configured by a storage device such as a nonvolatile semiconductor memory.

The operation unit 56 includes a manual input unit 56a configured to accept manual input to the external terminal 50, and a display unit 56b configured to display and output various types of information. The external terminals 50 are each provided with a touch screen 75 (see FIG. 1) configured by embedding piezoelectric sensors or the like in a liquid crystal display panel. The touch screen 75 functions as part of the manual input unit 56a and also functions as part of the display unit 56b.

The controller 59 is a control unit built into the external terminal 50 and configured to perform overall control of the external terminal 50. The controller 59 is configured as a computer system that includes, for example, a CPU and various types of semiconductor memories (a RAM and a ROM). The controller 59 implements various types of processing units by causing the CPU to execute a predetermined software program (hereinafter, also simply referred to as a "program") PG2 stored in a memory unit (e.g., a semiconductor memory). Note that the program PG2 may be installed on the external terminal 50 using a portable recording medium such as a USB memory (in other words, various types of computer-readable non-transitory recording media) or via the network NW or the like.

The program PG2 is application software for remotely operating the image forming apparatus 10 and implements various functions regarding remote operations.

Specifically, the controller 59 executes the program PG2 to implement various types of processing units including a communication control unit 61 and an input/output control unit 65 as shown in FIG. 3.

The communication control unit 61 is a processing unit configured to control communication with the image forming apparatus 10 or the like in cooperation with, for example, the communication unit 54. Specifically, the communication control unit 61 includes a transmission unit and a reception unit. The transmission unit is configured to transmit manual input information PJ on manual input to the remote operation image ROI toward the MFP 10. The reception unit is configured to receive data for displaying the remote operation image ROI from the MFP 10.

The input/output control unit 65 is a processing unit configured to control display operations performed by the display unit 56b (e.g., the touch screen 75).

4. Operations

Figure 4:
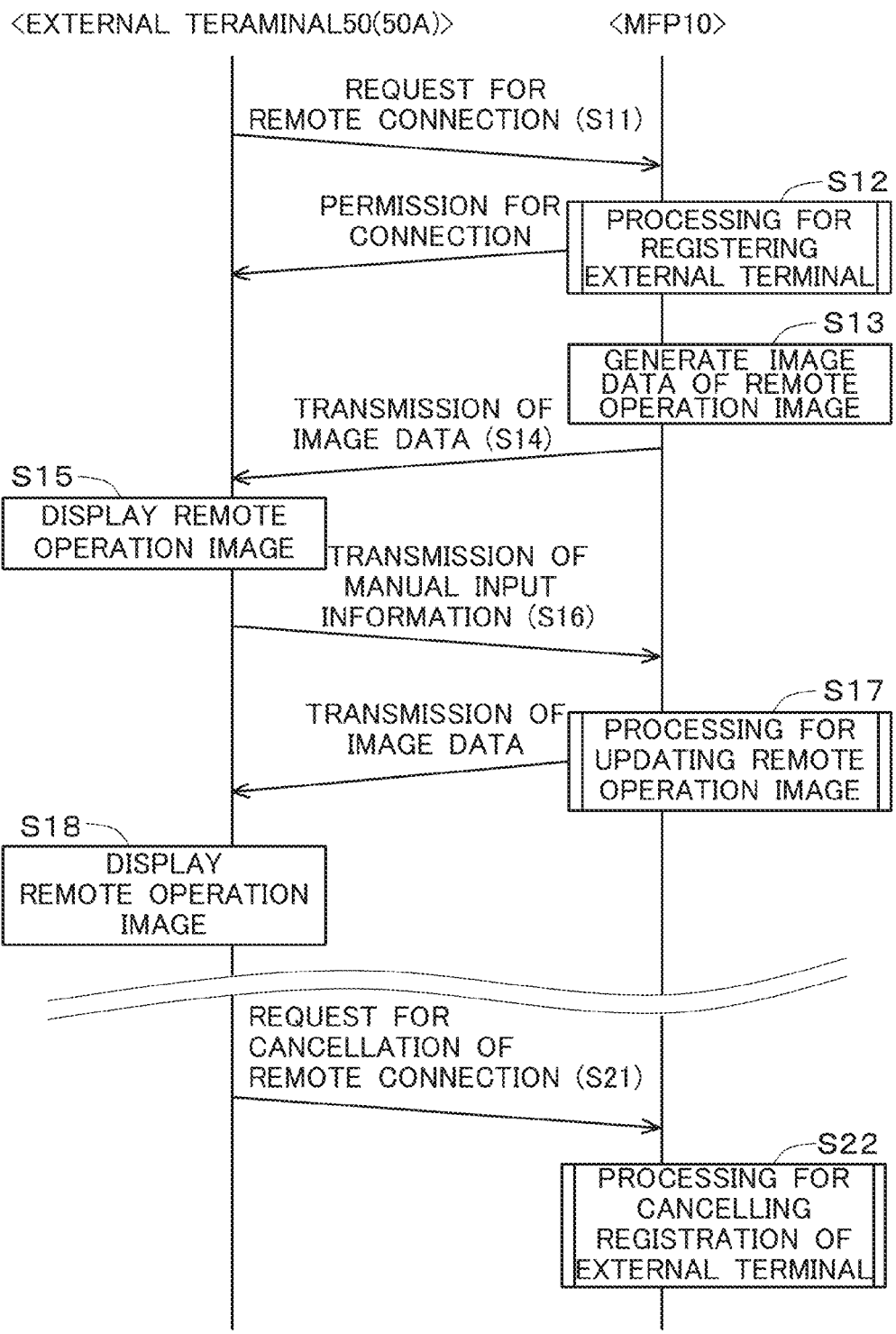
FIG. 4 is a sequence diagram of operations performed in the image forming system.

Next is a description of operations performed in the image forming system 1. FIG. 4 is a sequence diagram of these operations. Here, the case of remotely operating the MFP 10 by an external terminal 50 (50A) is described as an example.

First, the external terminal 50A starts up the program PG2 for remote operations and requests the MFP 10 to establish remote connection (step S11).

In response to the connection request from the external terminal 50A, the MFP 10 executes processing for registering the external terminal 50A (step S12). Specifically, the MFP 10 executes processing shown in the flowchart of FIG. 5.

Figure 5:
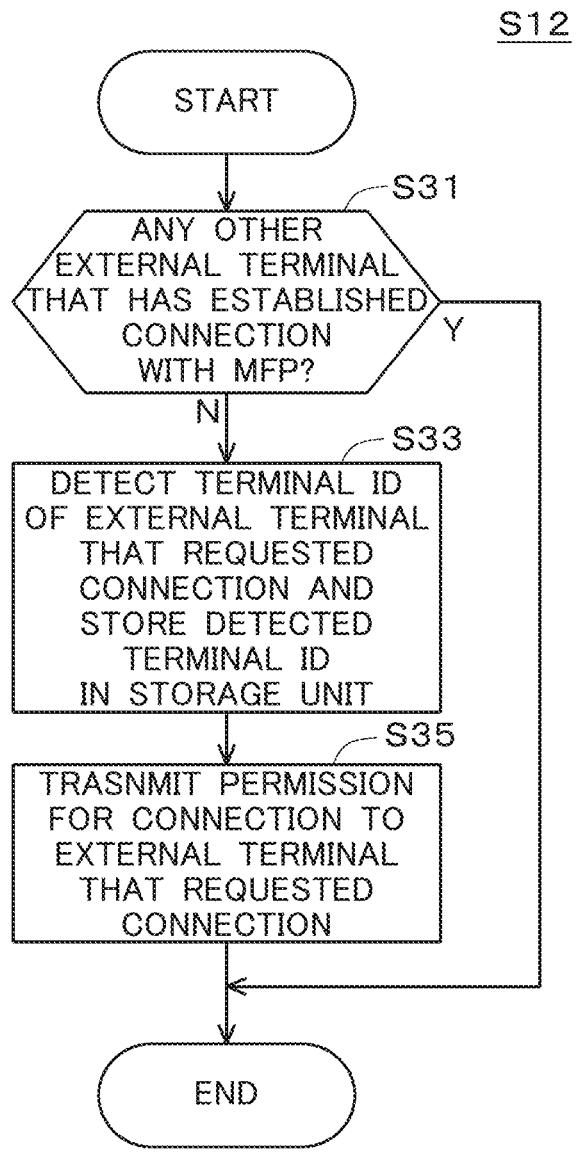
FIG. 5 is a flowchart of operations performed by the image forming apparatus.

First, in step S31 in FIG. 5, the MFP 10 determines whether or not there is another external terminal 50 (e.g., 50B) that has already established connection with the MFP 10. Specifically, the MFP 10 determines the presence or absence of such another external terminal 50 by checking whether or not the storage unit 5 stores the terminal ID of another external terminal 50 that has already established connection with the MFP 10.

If it is determined that there is another external terminal 50 (e.g., 50B) that has already established connection with the MFP 10, the MFP 10 ends the processing without establishing connection with the external terminal 50A that requested connection. If there is no external terminal 50 that has already established connection with the MFP 10, the processing proceeds to step S33.

In step S33, the MFP 10 detects the terminal ID of the external terminal 50A that requested connection and stores the detected terminal ID into the storage unit 5.

After this, in step S35, the MFP 10 transmits permission for connection toward the external terminal 50A. As a result, connection is established between the MFP 10 and the external terminal 50A.

The operations to be performed in the image forming system 1 continue to be described with reference to FIG. 4.

When connection has been established between the MFP 10 and the external terminal 50A, the generation unit 13 of the MFP 10 generates an initial remote operation image ROI (ROI1) (step S13). Specifically, the generation unit 13 combines a call key image CK (CK1) (see FIG. 10), which will be described later, with an operation screen image OSI (see FIG. 10), which will also be described later, to generate an image (hereinafter, referred to as a "composite image CI1") as the initial remote operation image ROI (ROI1).

Figure 10:
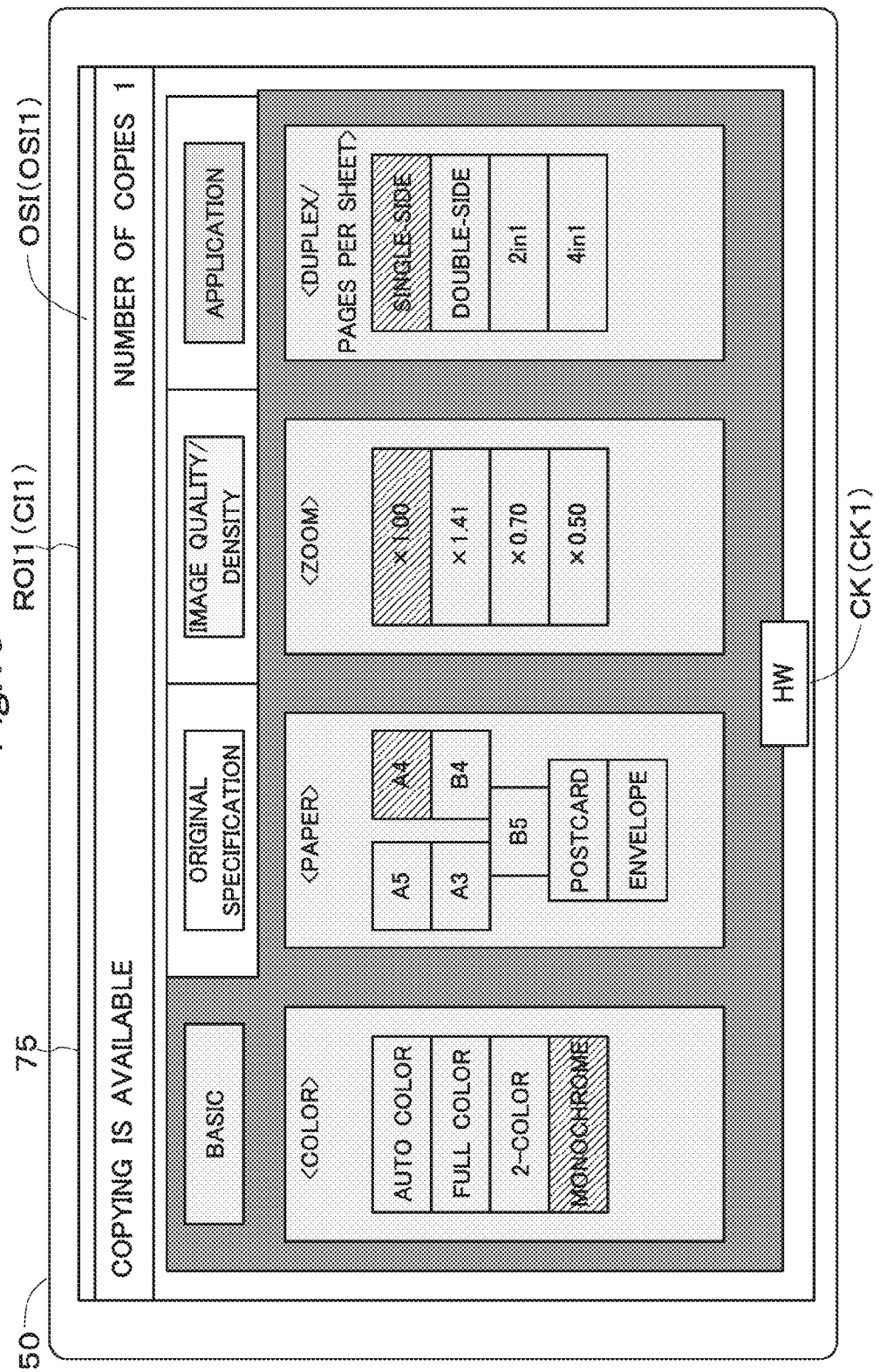
FIG. 10 illustrates a remote operation screen displayed on the external terminal.

The operation screen image OSI is an image corresponding to an operation screen used to operate the MFP 10 (i.e., an image depicting the operation screen displayed on the touch screen 25 of the MFP 10) as shown in FIG. 10. The call key image CK is a key image for accepting a display instruction to display a hardware key area image HKA (see FIG. 11), which will be described later, within the operation screen image OSI. In short, the call key image CK is an image for calling the hardware key area image HKA described below (an image for accepting a call instruction). Here, the call key image CK has a rectangular shape as shown in FIG. 10.

Figure 11:
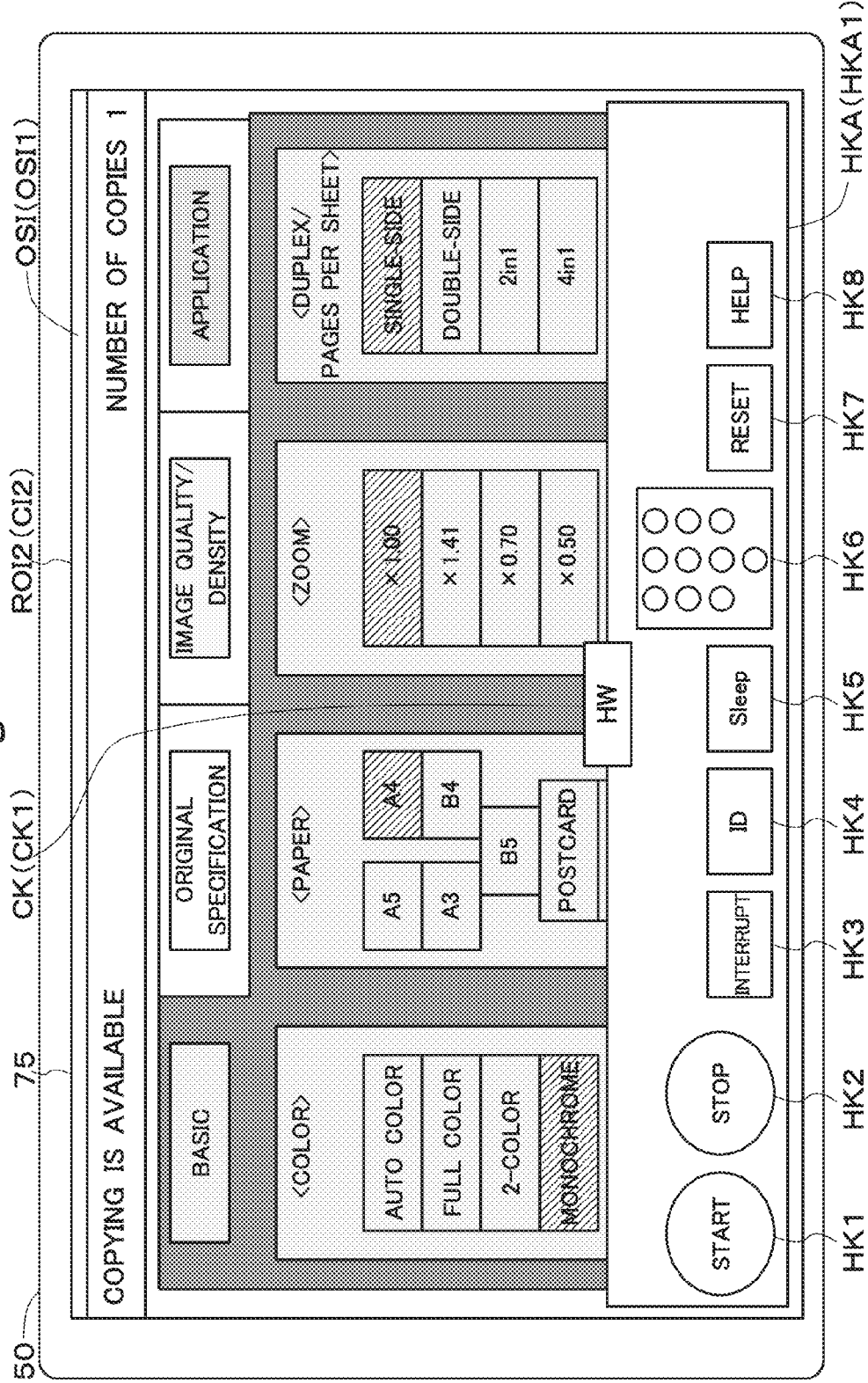
FIG. 11 illustrates a remote operation screen displayed on the external terminal.

The hardware key area image HKA is displayed over part of the operation screen image OSI as shown in FIG. 11. The hardware key area image HKA is an image of an area that includes a plurality of hardware key images HK1 to HK8. The detail of the hardware key area image HKA will be described later.

When the aforementioned composite image CI1 (see FIG. 10) is generated by the generation unit 13 (step S13), the communication control unit 11 of the MFP 10 transmits image data DT1 of the composite image CI1 toward the external terminal 50 as data for displaying the remote operation image ROI (step S14).

In response to this transmission, the communication control unit 61 of the external terminal 50 receives the image data DT1 of the composite image CI1 from the MFP 10. Then, the input/output control unit 65 of the external terminal 50 displays the composite image CI1 based on the image data DT1 on the touch panel 75 as the initial remote operation image ROI1 (see FIG. 10).

The operation screen image OSI1 is constituted by a plurality of tabs that correspond respectively to general categories ("Basic," "Original Specification," "Image Quality/Density, and "Application") of setting items of the MFP 10 as shown in FIG. 10. Here, the tab corresponding to the general category "Basic" is selected, and operation button images for the setting items ("Color," "Paper," "Zoom," and "Duplex/Pages per Sheet") that belong to the general category "Basic" are displayed. The operation button images are images corresponding to operation buttons provided on the operation screen of the MFP 10. For example, the setting item "Color" is provided with four operation button images ("Auto Color," "Full Color," "2-Color," and "Monochrome"). If, for example, the operation button image "Auto Color" is selected, "Auto Color" is set for the setting item "Color."

The call key image CK is combined so as to be arranged within an area of the operation screen image OSI1 in the vicinity of one side (specifically, the lower side) of the operation screen image OSI1 (specifically, an area spaced by approximately several millimeters above the lower side).

When manual input by the operator is accepted via the remote operation image ROI1, the communication control unit 61 of the external terminal 50 transmits manual input information PJ on the manual input to the MFP 10 (specifically, coordinate information on the position where the manual input is detected) (step S16).

Here, assume a situation in which manual input to the call key image CK in the remote operation image ROI1 is accepted. The communication control unit 61 of the external terminal 50 transmits the manual input information PJ that includes the coordinates of the position of the call key image CK in the remote operation image ROI1, to the MFP 10.

Figure 6:
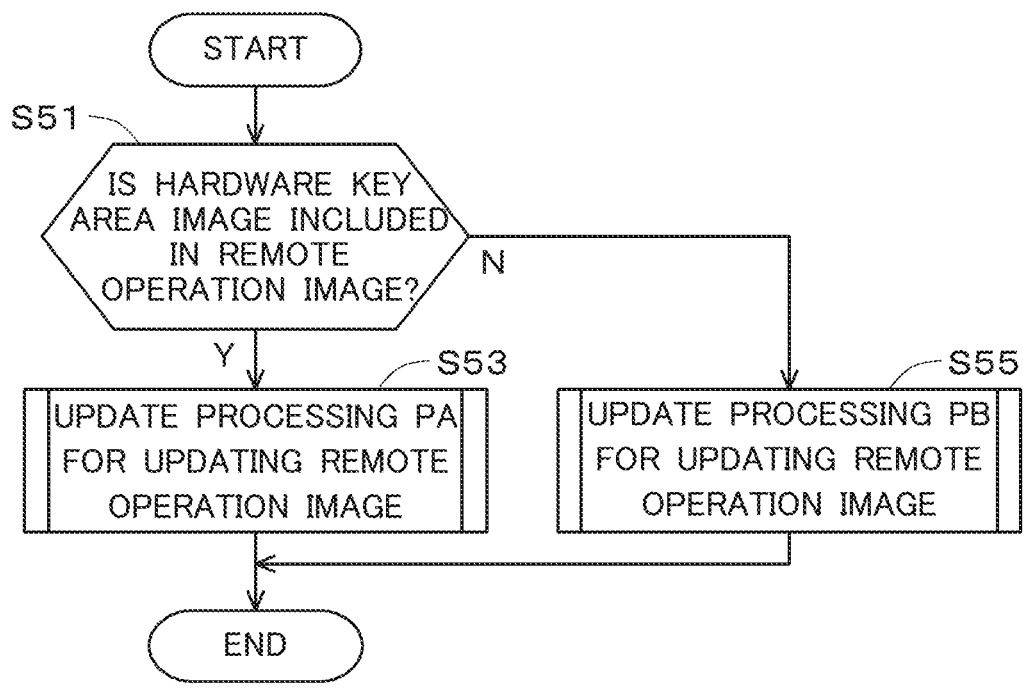
FIG. 6 is a flowchart of operations performed by the image forming apparatus.

In response to this transmission, the communication control unit 11 of the MFP 10 receives the manual input information PJ from the external terminal 50. Then, the MFP 10 executes processing for updating the remote operation image ROI on the basis of the manual input information PJ (step S17). Specifically, the MFP 10 executes processing shown in the flowchart of FIG. 6.

First, in step S51, the MFP 10 determines whether or not the remote operation image ROI1 (see FIG. 10) includes the hardware key area image HKA. Here, it is determined that the remote operation image ROI1 (see FIG. 10) does not include the hardware key area image HKA, and the processing proceeds to step S55. If it is determined that the remote operation image ROI includes the hardware key area image HKA, the processing proceeds to step S53. The detail of the processing of step S53 will be described later.

In step S55, the MFP 10 executes processing for updating the remote operation image ROI (hereinafter, also referred to as "update processing PB"). Specifically, the MFP 10 executes processing shown in the flowchart of FIG. 8.

First, in step S61, the MFP 10 determines on the basis of the manual input information PJ whether or not manual input to the call key image CK in the remote operation image ROI1 is accepted. Here, it is determined that manual input to the call key image CK is accepted, and the processing proceeds to step S62.

In step S62, the generation unit 13 of the MFP 10 combines a hardware key area image HKA1 with the operation screen image OSI1 such that the hardware key area image HKA1 is displayed within and over the operation screen image OSI1, so as to generate an image (hereinafter, also referred to as a "composite image CI2") (see FIG. 11) as the remote operation image ROI (ROI2). Specifically, the generation unit 13 generates the composite image CI2 by combining the hardware key area image HKA1 such that the hardware key area image HKA1 is arranged within an area of the operation screen image OSI1 in the vicinity of the lower side of the operation screen image OSI1. The data capacity of the composite image CI2 is less than the total value of the data capacity of image data of the operation screen image OSI1 and the data capacity of image data of the hardware key area image HKA1.

After this, in step S63, the communication control unit 11 of the MFP 10 transmits image data DT2 of the composite image CI2 generated in step S62 toward the external terminal 50 as data for displaying the remote operation image ROI2.

In response to this transmission, the communication control unit 61 of the external terminal 50 receives the image data DT2 of the composite image CI2 from the MFP 10. Then, the input/output control unit 65 of the external terminal 50 displays the composite image CI2 (see FIG. 11) based on the image data DT2 on the touch panel 75 as the remote operation image ROI2 (step S18).

The hardware key area image HKA1 is configured by hardware key images HK1 to HK8 as shown in FIG. 11. The hardware key images HK1 to HK5, HK7, and HK8 are images corresponding respectively to hardware keys KY1 to KY5, KY7, and KY8 (not shown) provided externally of the touch screen 25 of the MFP 10. A user of the external terminal 50 can remotely operate the hardware keys KY1 to KY5, KY7, and KY8 (not shown) via the hardware key images HK1 to HK5, HK7, and HK8.

The hardware key image HK6 is a hardware key image corresponding to 10 hardware keys (hereinafter, also referred to as a "hardware key group GN") that constitute a keypad (not shown) of the MFP 10.

In this way, the hardware key area image HKA1 is an image of an area (also referred to as a "hardware key area") that includes the aforementioned hardware key images HK1 to HK5, HK7, and HK8 and also includes the hardware key image HK6 corresponding to the hardware key group GN.

Figure 8:
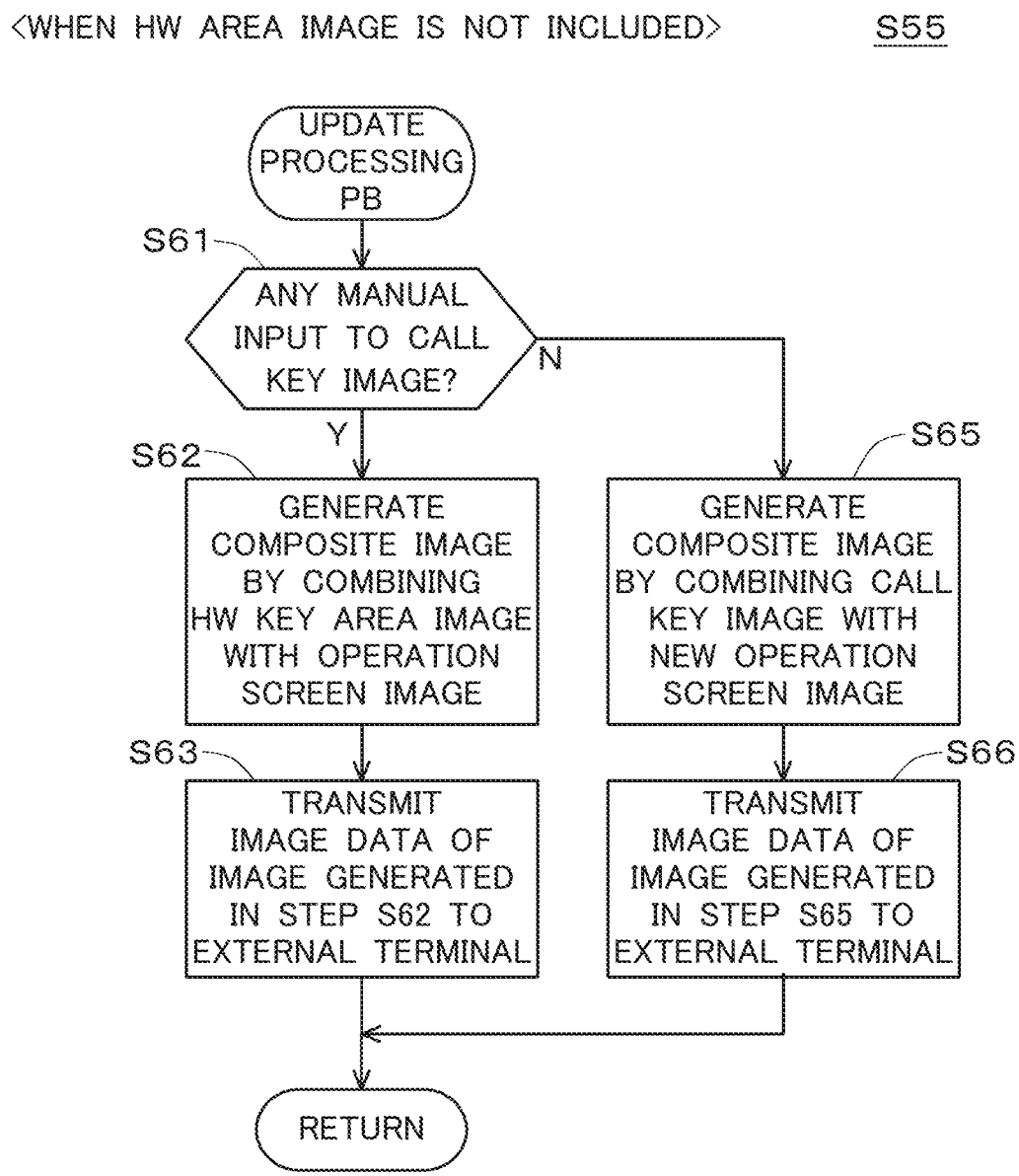
FIG. 8 is a flowchart of operations performed by the image forming apparatus.

If it is determined in step S61 in FIG. 8 that manual input to the call key image CK is not accepted, the processing proceeds to step S65. In step S65, a new composite image (not shown) is generated by combining the call key image CK with a new operation screen image corresponding to manual input to the operation screen image OSI1 (see FIG. 10). Then, in step S66, image data DT of the new composite image is transmitted toward the external terminal 50 and the new composite image (not shown) is displayed as the remote operation image ROI on the touch panel 75 of the external terminal 50. For example, assume that the operation button image "Auto Color" is selected from among the four buttons for the setting item "Color" in the operation screen image OSI1 shown in FIG. 10. In this case, a new operation screen image OSI (not shown) is generated by changing the currently selected operation button image "Monochrome" to a non-selected state (non-hatched state) and the newly selected operation button image "Auto Color" to a selected state (hatched state), and a new composite image (not shown) is generated by combining the call key image CK with the new operation screen image OSI.

After the transmission operation in step S63 in FIG. 8, the remote operation image ROI2 (see FIG. 11) is displayed on the external terminal 50, and if in this state, manual input by the operator is accepted via the remote operation image ROI2, the aforementioned processing of step S16 in FIG. 4 is executed once again.

Specifically, if manual input to one of the hardware key images HK1 to HK8 is accepted via the hardware key area image HKA1 in the remote operation image ROI2, manual input information PJ on the manual input is transmitted from the external terminal 50 to the MFP 10, and the MFP 10 appropriately executes processing or the like based on the manual input information PJ. For example, if manual input to the hardware key image HK1 (start key image) in the hardware key area image HKA1 is accepted, the MFP 10 starts processing such as copy processing specified by the operator.

Below is a detailed description of operations performed in an assumed situation in which, prior to manual input to the start key image, manual input to the hardware key image HK6 in the hardware key area image HKA is accepted for the purpose of setting the number of copies in copy processing. The hardware key image HK6 is, as described above, an image corresponding to the keypad (hardware key group GN) of the MFP 10. It is assumed that the number of copies in copy processing is set to "1" as the initial value.

When manual input to the hardware key image HK6 is accepted, the communication control unit 61 of the external terminal 50 transmits manual input information PJ including the coordinates of the position of the hardware key image HK6 in the remote operation image ROI2, to the MFP 10 (step S16).

In response to this transmission, the MFP 10 executes processing for updating the remote operation image ROI on the basis of the manual input information PJ (step S17). Specifically, the MFP 10 executes the processing shown in the flowchart of FIG. 6.

First, in step S51, the MFP 10 determines whether or not the remote operation image ROI2 (see FIG. 11) includes the hardware key area image HKA. Here, it is determined that the remote operation image ROI2 (see FIG. 11) includes the hardware key area image HKA (HKA1), and the processing proceeds to step S53.

In step S53, the MFP 10 executes processing for updating the remote operation image ROI (hereinafter, also referred to as "update processing PA"). Specifically, the MFP 10 executes processing shown in the flowchart of FIG. 7.

First, in step S71, the MFP 10 determines, on the basis of the manual input information PJ, whether or not manual input to the call key image CK in the remote operation image ROI2 is accepted. Here, it is determined that manual input to the call key image CK is not accepted, and the processing proceeds to step S75.

In step S75, the generation unit 13 of the MFP 10 generates a new remote operation image ROI corresponding to manual input to the remote operation image ROI2. Specifically, the generation unit 13 generates a new remote operation image ROI (ROI3) corresponding to the manual input to the hardware key image HK6. To be more specific, the generation unit 13 generates, as the remote operation image ROI3, an image (hereinafter, also referred to as a "composite image CI3") (see FIG. 12) by combining an enlarged hardware key group image ZG, which will be described later, with the remote operation image ROI2 (composite image CI2) (see FIG. 11).

After this, in step S76, the communication control unit 11 of the MFP 10 transmits image data DT3 of the composite image CI3 generated in step S75 toward the external terminal 50 as data for displaying the remote operation image ROI3.

In response to this transmission, the communication control unit 61 of the external terminal 50 receives the image data DT3 of the composite image CI3 from the MFP 10. Then, the input/output control unit 65 of the external terminal 50 displays the composite image CI3 (see FIG. 12) based on the image data DT3 on the touch panel 75 as the remote operation image ROI3 (step S18).

Figure 12:
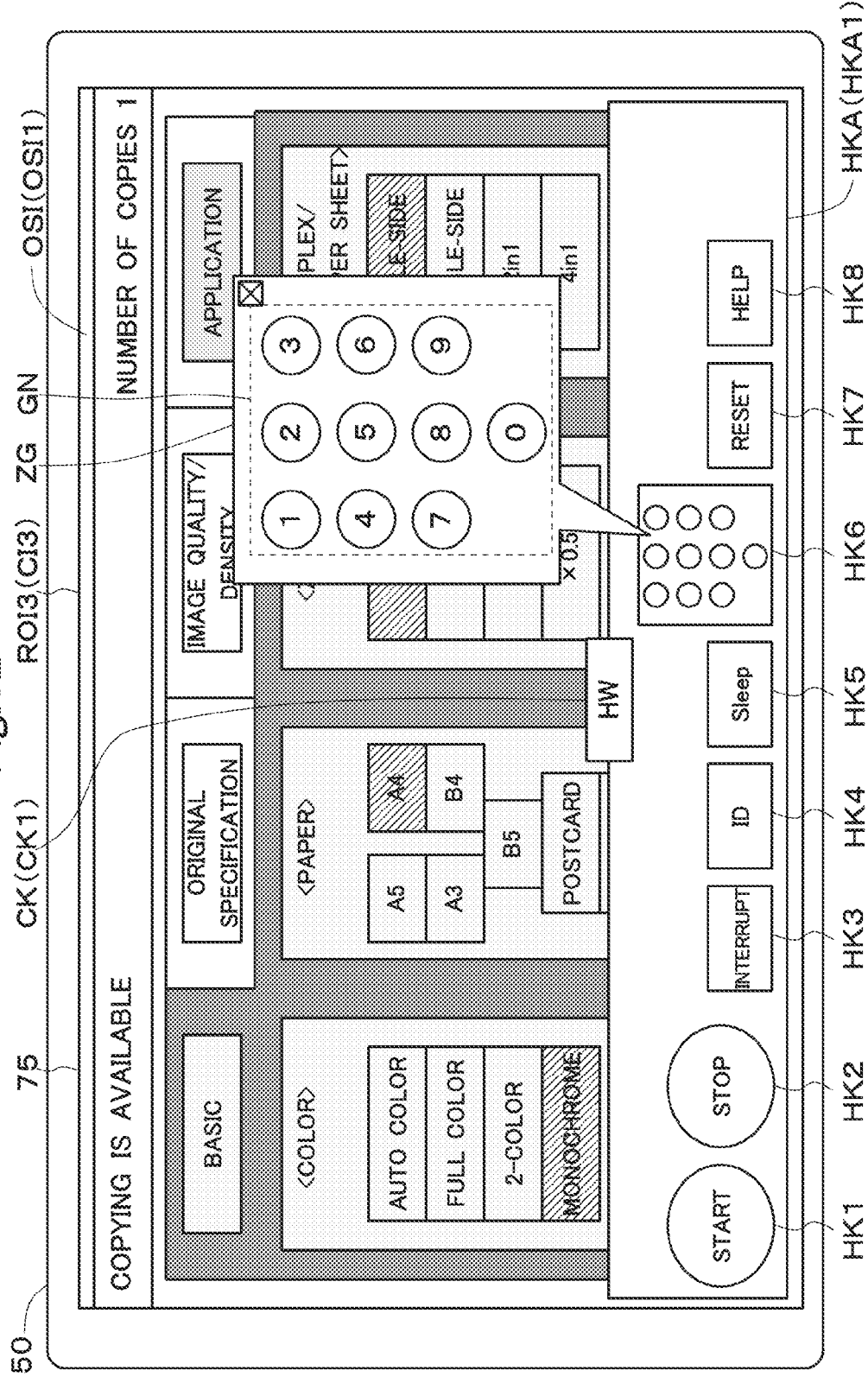
FIG. 12 illustrates a remote operation screen displayed on the external terminal.

As shown in FIG. 12, the enlarged hardware key group image ZG is larger than the hardware key image HK6 corresponding to the hardware key group GN and corresponds to the 10 hardware keys (hardware key group GN) constituting the keypad of the MFP 10. A user of the external terminal 50 can remotely operate the keypad of the MFP 10 via the enlarged hardware key group image ZG. Specifically, the user can set the number of copies in copy processing by operating the keypad of the MFP 10 via the enlarged hardware key group image ZG.

Figure 7:
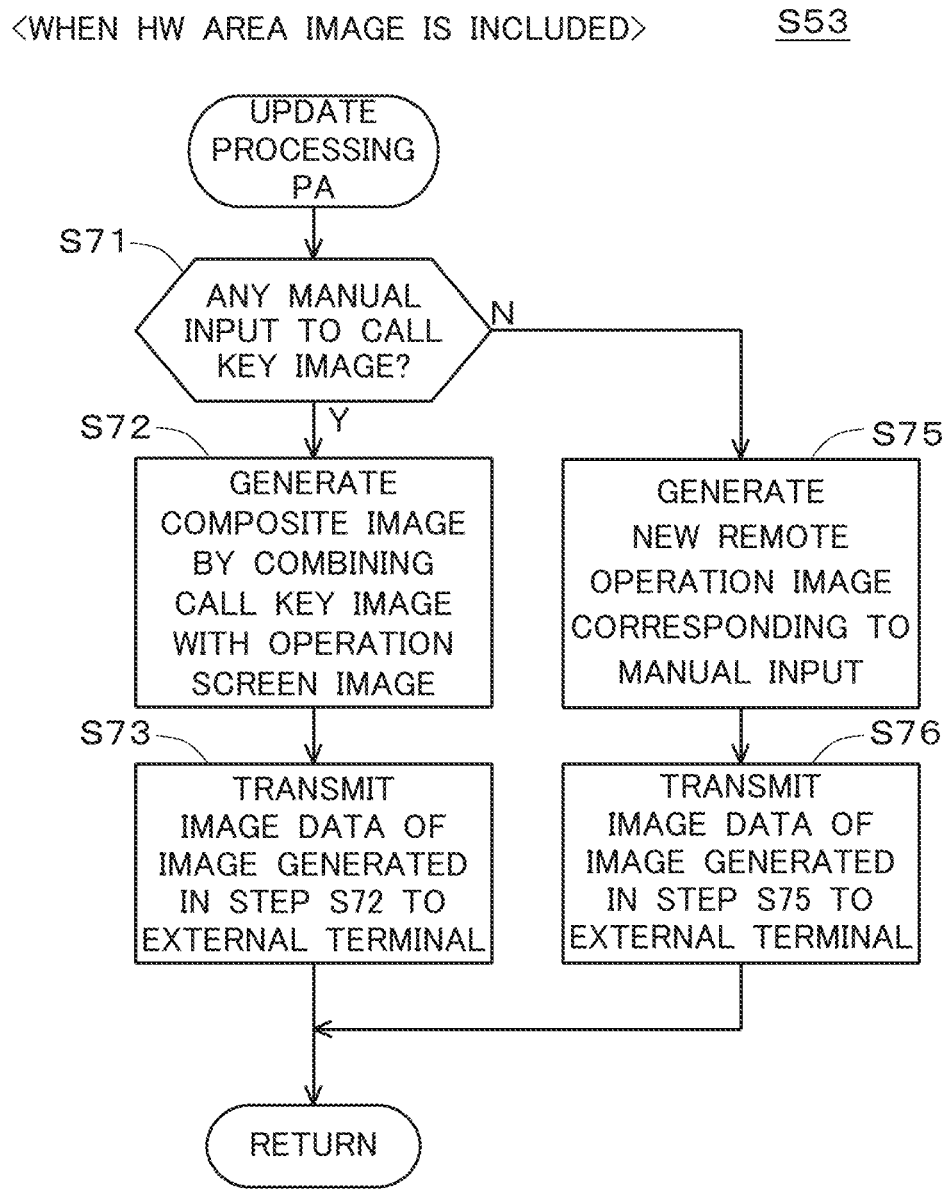
FIG. 7 is a flowchart of operations performed by the image forming apparatus.

If it is determined in step S71 in FIG. 7 that manual input to the call key image CK is accepted, it is determined that an instruction to hide the hardware key area image HKA1 (see FIG. 11) (hereinafter, also referred to as a "non-display instruction") is accepted, and the processing proceeds to step S72.

In step S72, the generation unit 13 of the MFP 10 regenerates the aforementioned composite image CI1 (see FIG. 10) (i.e., the image before being combined with the hardware key area image HKA1).

Then, in step S73, the communication control unit 11 of the MFP 10 transmits the image data DT1 of the composite image CI1 regenerated in step S72 toward the external terminal 50 as data for displaying the remote operation image ROI1.

In response to this transmission, the input/output control unit 65 of the external terminal 50 displays the composite image CI1 once again on the touch panel 75 as the remote operation image ROI1 (see FIG. 10).

After this, if the external terminal 50A accepts an instruction to cancel connection (manual input of an instruction to cancel remote connection) from the operator at a certain point in time, the external terminal 50A requests the MFP 10 to cancel its remote connection (step S21 in FIG. 4).

Figure 9:
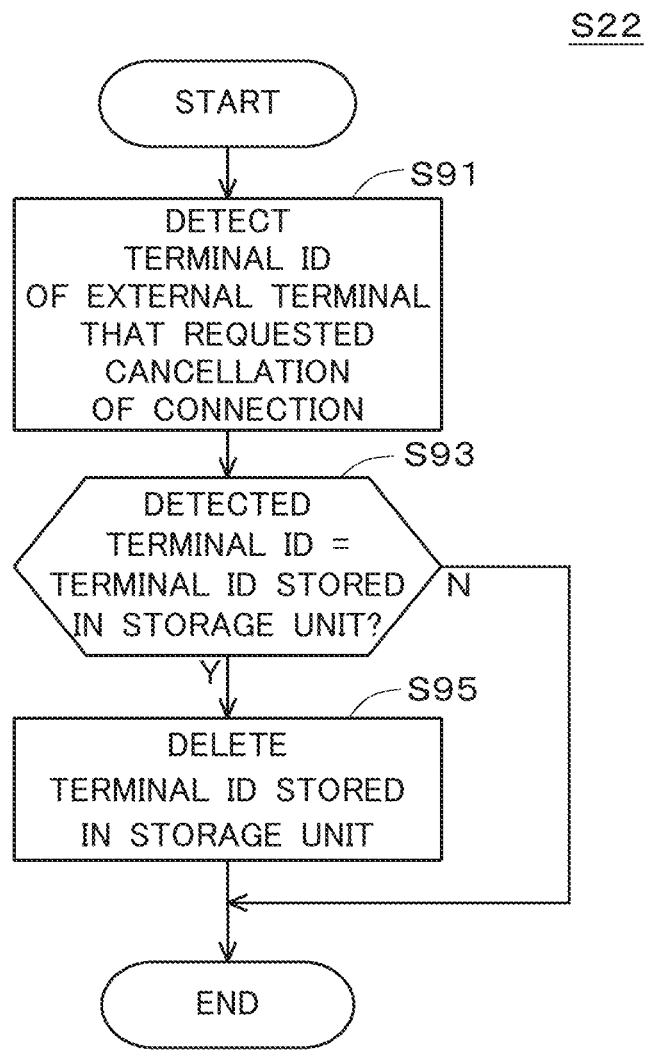
FIG. 9 is a flowchart of operations performed by the image forming apparatus.

In response to the request to cancel connection from the external terminal 50A, the MFP 10 executes processing for cancelling the registration of the external terminal 50A (step S22). Specifically, the MFP 10 executes processing shown in the flowchart of FIG. 9.

First, in step S91, the MFP 10 detects the terminal ID of the external terminal 50A that requested the cancellation of connection.

Next, in step S93, the MFP 10 determines whether or not the terminal ID of the external terminal 50A matches the terminal ID stored in the storage unit 5. Here, it is determined that the terminal IDs match, and the processing proceeds to step S95. If the terminal IDs do not match, the MFP 10 ends the processing of step S22 (in the flowchart of FIG. 9) without executing the processing of step S95.

In step S95, the MFP 10 deletes the terminal ID of the external terminal 50A stored in the storage unit 5.

Through the operations described above, the composite image CI2 (see FIG. 11) as the remote operation image ROI2 is generated by combining the hardware key area image HKA1 such that the hardware key area image HKA1 is arranged within the operation screen image OSI1, and the image data DT2 of the composite image CI2 is transmitted to the external terminal 50. Here, the data capacity of the image data DT2 is less than the total value of the data capacity of the image data of the operation screen image OSI1 and the data capacity of the image data of the hardware key area image HKA1. Accordingly, a delay in the transmission of the image data DT2 is less likely to occur during remote operations of the MFP 10 and therefore, it is possible to avoid the possibility of reducing the operability of the MFP 10 during remote operations.

In addition, prior to the transmission of the image data DT2 of the composite image CI2 (see FIG. 11), the image data DT1 of the composite image CI1 (see FIG. 10) is transmitted to an external terminal 50 as data for displaying the remote operation image ROI1, and the composite image CI1 is displayed on the touch panel 75 of the external terminal 50. In short, the remote operation image ROI1 shown in FIG. 10 is displayed prior to display of the remote operation image ROI2 shown in FIG. 11. When manual input to the call key image CK in the remote operation image ROI1 is accepted, the composite image CI2 as the remote operation image ROI2 is generated by combining the hardware key area image HKA1 such that the hardware key area image HKA1 is arranged within the operation screen image OSI1. Accordingly, it is possible to display the hardware key area image HKA1 whenever it is necessary to remotely operate the hardware keys of the MFP 10.

Furthermore, the call key image CK can be displayed in the area in which no operation button images are displayed, in the operation screen image OSI1, because the composite image CI2 is generated by combining the call key image CK such that the call key image CK is arranged within the area of the operation screen image OSI1 in the vicinity of the lower side of the operation screen image OSI1 (see FIG. 10).

Moreover, when manual input to the hardware key image HK6 in the hardware key area image HKA1 (see FIG. 11) is accepted, the composite image CI3 is generated by combining the enlarged hardware key group image ZG larger than the hardware key image HK6 such that the enlarged hardware key group image ZG is arranged within the remote operation image ROI2. Then, the generated composite image CI3 is displayed on the touch panel 75 of the external terminal 50 (see FIG. 12). Using the enlarged hardware key group image ZG, which is larger than the hardware key image HK6 corresponding to the hardware key group GN, during remote operations of the hardware key group GN makes it possible to accurately operate the hardware key group GN.

Variations

While the above has been a description of embodiments of the present invention, the present invention is not intended to be limited to the details described above.

Call Key Image CK

For example, while the above embodiment describes a case in which the composite image CI1 generated by combining the call key image CK such that the call key image CK is arranged within the area of the operation screen image OSI1 in the vicinity of the lower side of the operation screen image OSI1 is displayed as the remote operation image ROI1 (see FIG. 10), the present invention is not limited thereto. The composite image to be displayed as the remote operation image ROI may be generated by combining the call key image CK such that the call key image CK is arranged within an area of the operation screen image OSI1 in the vicinity of a side of the operation screen image OSI1 other than the lower side.

Figure 13:
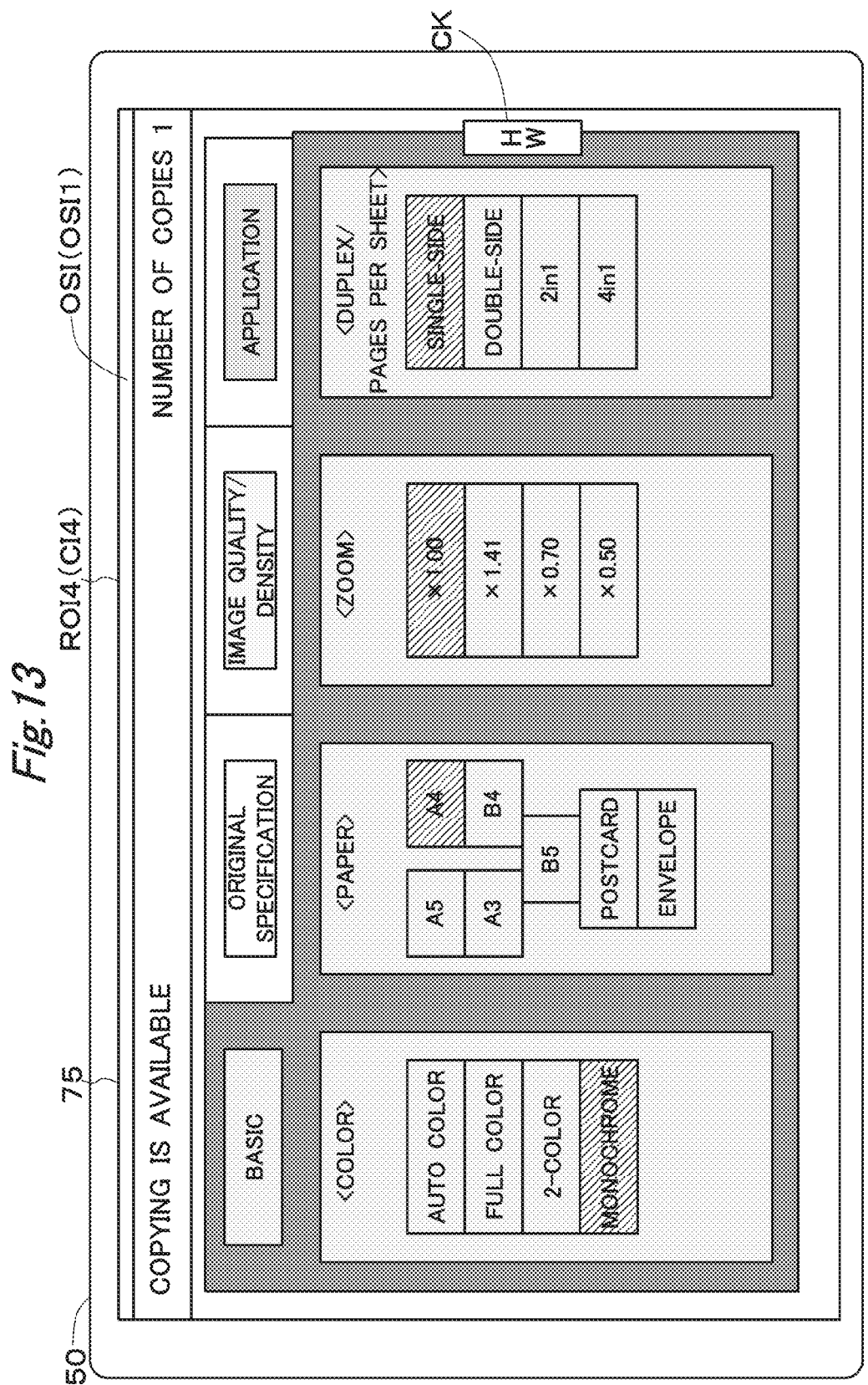
FIG. 13 illustrates a remote operation screen displayed on the external terminal according to a variation.
Figure 14:
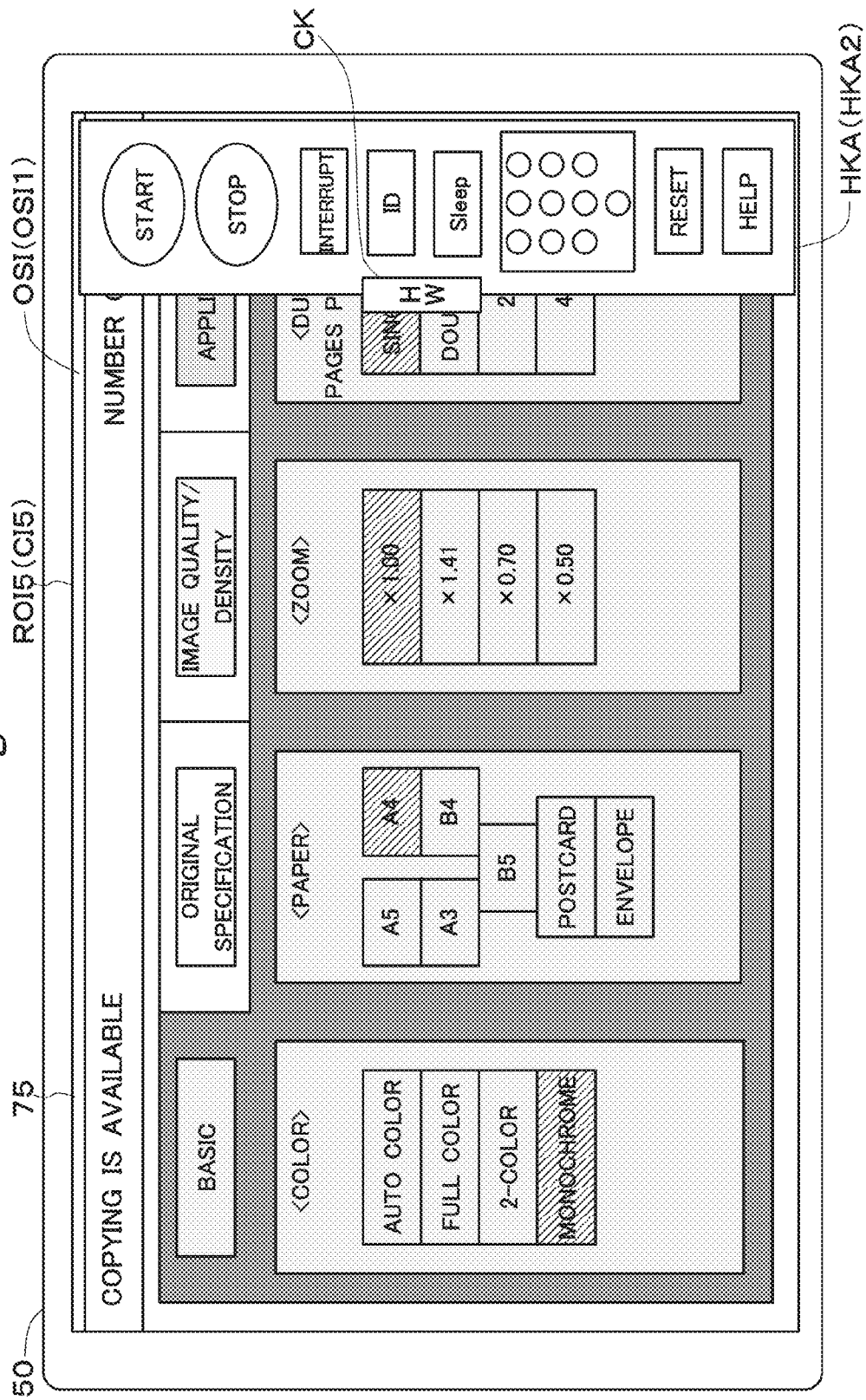
FIG. 14 illustrates a remote operation screen displayed on the external terminal according to a variation

Specifically, a composite image CI4 (see FIG. 13) generated by combining the call key image CK such that the call key image CK is arranged within an area of the operation screen image OSI1 in the vicinity of the right side of the operation screen image OSI1 (specifically, an area spaced leftward (inward) by approximately several millimeters on the left of the right side) may be displayed as the remote operation image ROI (ROI4) as shown in FIG. 13. Then, when manual input to the call key image CK in the remote operation image ROI4 is accepted, a composite image CI5 (see FIG. 14) generated by combining a hardware key area image HKA2 such that the hardware key area image HKA2 is arranged within an area of the operation screen image OSI1 in the vicinity of the right side of the operation screen image OSI1 may be displayed as the remote operation image ROI (ROI5) on the touch screen 75 of the external terminal 50.

Similarly, a composite image generated by combining the call key image CK such that the call key image CK is arranged within an area of the operation screen image OSI1 in the vicinity of the left side of the operation screen image OSI1 may be displayed, or a composite image generated by combining the call key image CK such that the call key image CK is arranged within an area of the operation screen image OSI1 in the vicinity of the upper side of the operation screen image OSI1 may be displayed.

While the above embodiment describes a case in which the call key image CK has a rectangular shape, the present invention is not limited thereto and the call key image CK may be of other shapes. For example, the call key image CK may have such a shape that indicates an orientation from one side of the upper, lower, right and left sides of the operation screen image OSI (e.g., the lower side) to the side (e.g., the upper side) opposite the one side.

Figure 15:
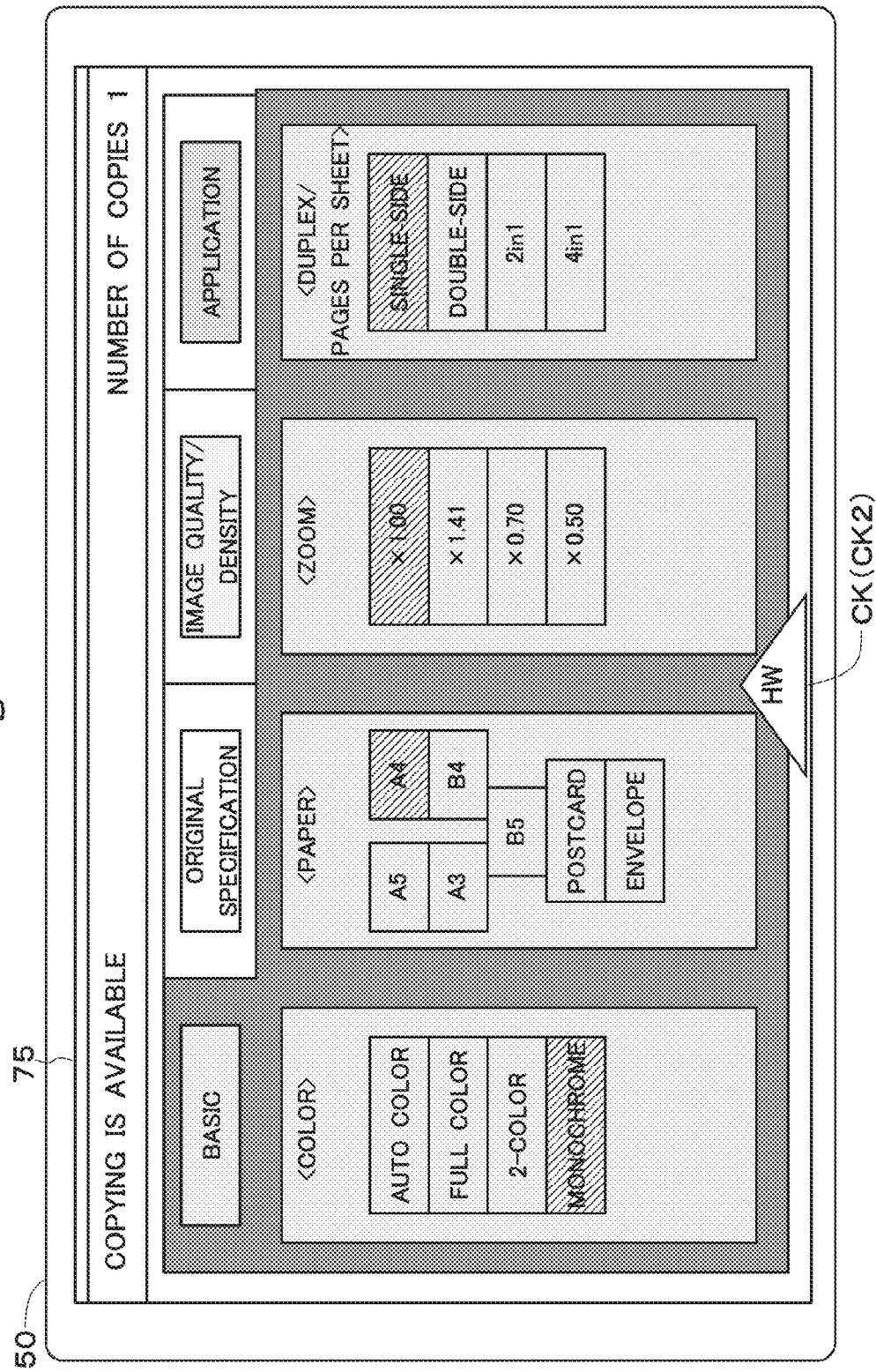
FIG. 15 illustrates a remote operation screen displayed on the external terminal according to a variation

Specifically, the call key image CK (CK2) may be in the shape of an isosceles triangle as shown in FIG. 15. In this case, the isosceles triangle (the call key image CK2) may be disposed such that the base of the isosceles triangle is parallel to the lower side of the operation screen image OSI and the top (sharpest part) of the isosceles triangle is above the lower side of the operation screen image OSI (closer to the upper side of the operation screen image OSI).

Figure 16:
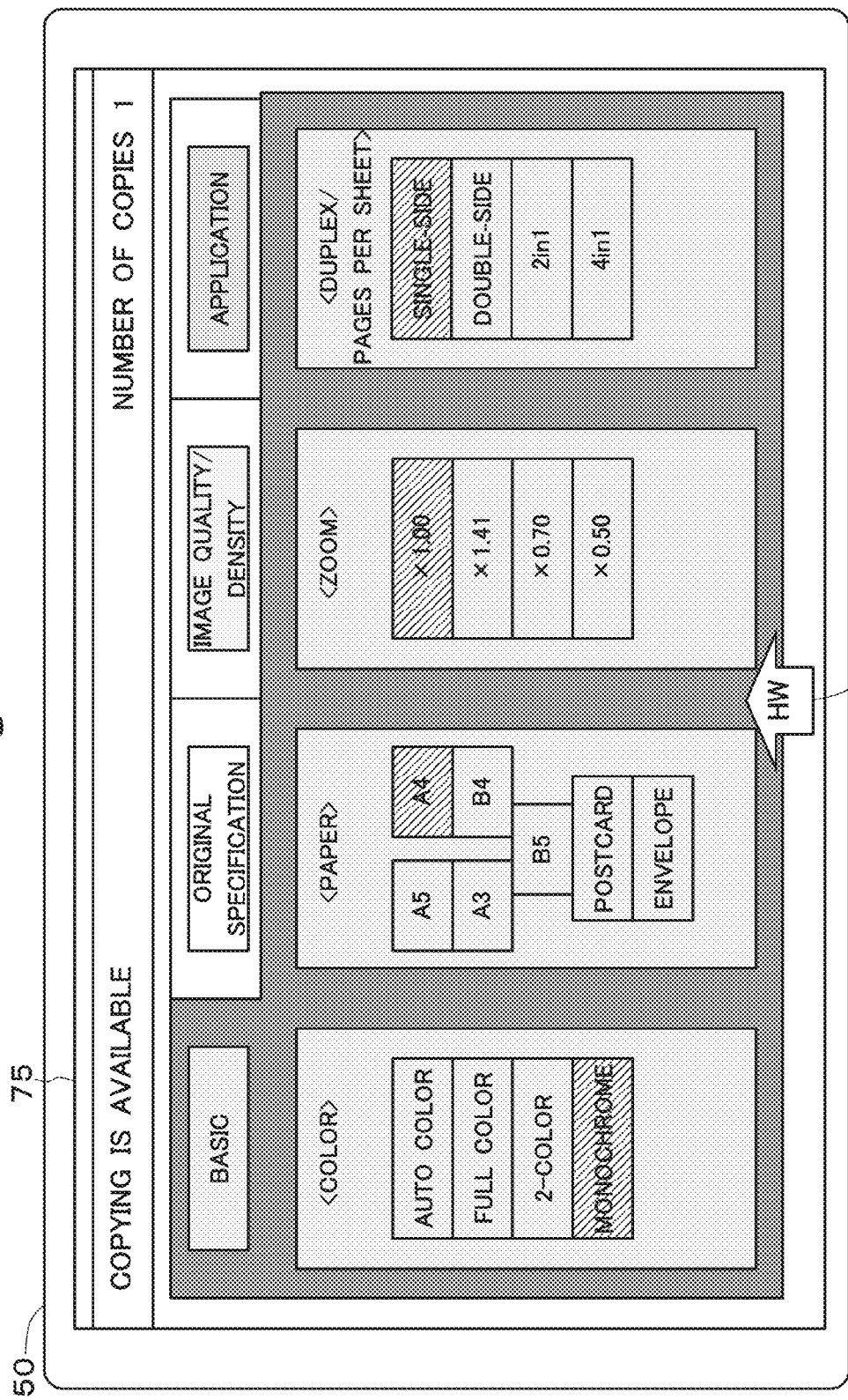
FIG. 16 illustrates a remote operation screen displayed on the external terminal according to a variation

Alternatively, the call key image CK (CK3) may be in the shape of an arrow as shown in FIG. 16. In this case, the arrow (the call key image CK3) may be disposed such that the direction from the stem of the arrow (the root of the arrow) to the ending point thereof (the sharp end of the arrow) is oriented in line with the direction from the lower side of the operation screen image OSI to the upper side of the operation screen image OSI.

These variations allow the operator to intuitively recognize the places where the hardware key area images HKA2 and HKA3 will appear with the press of the call key images CK2 and CK3.

Operation Screen Image

Figure 17:
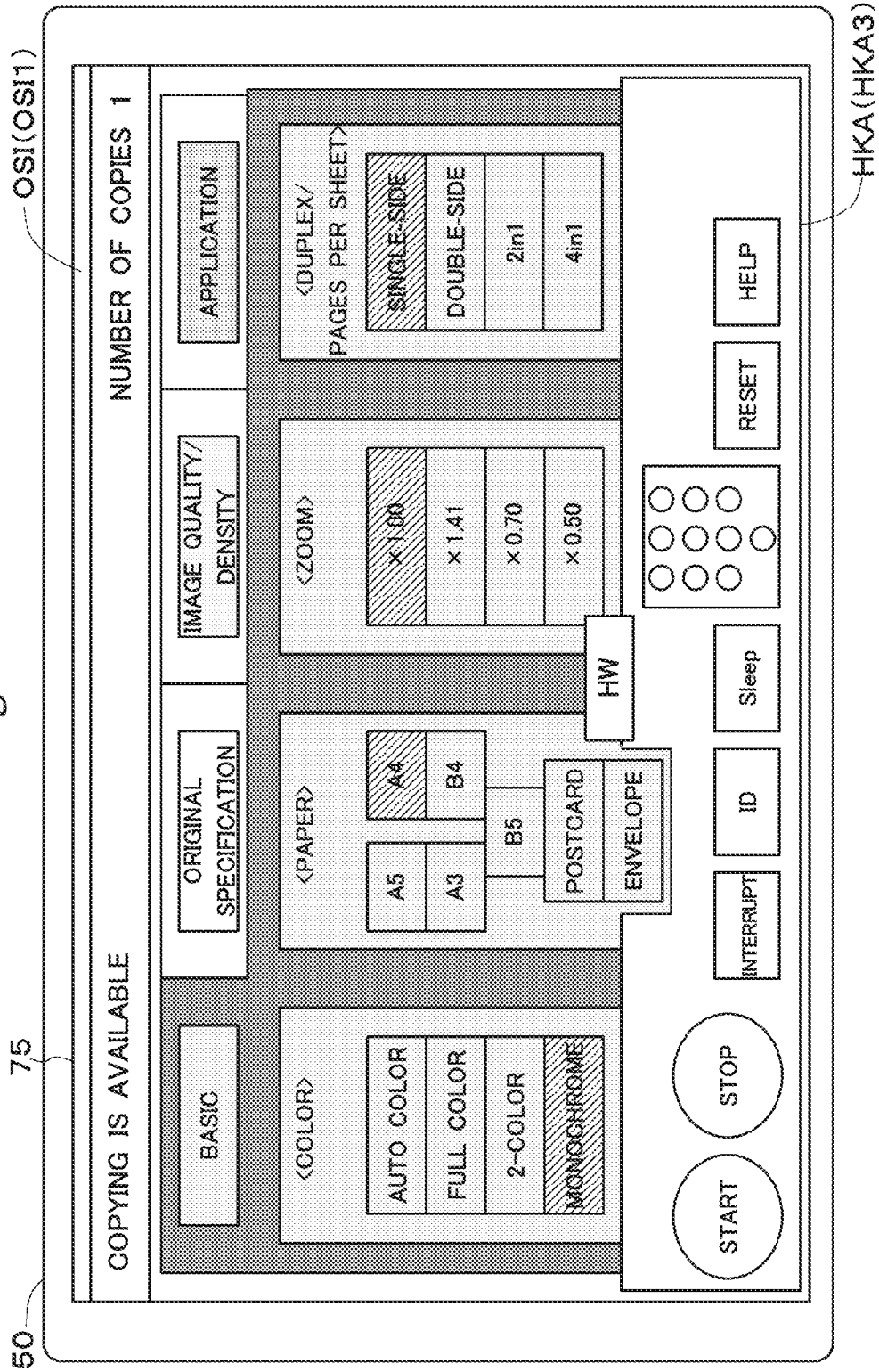
FIG. 17 illustrates a remote operation screen displayed on the external terminal according to a variation

While the above embodiment describes a case in which any of the operation button images provided in the operation screen image OSI1 (specifically, the operation button image "Envelope" for the setting item "Paper" (see FIG. 10)) may be hidden as a result of combining the hardware key area image HKA1 (see FIG. 11), the present invention is not limited to this example. For example, the hardware key area image HKA3 may be combined so as to be arranged within an area in which no operation button images are provided, in the operation screen image OSI1 as shown in FIG. 17. This prevents the operation button images in the operation screen image OSI1 from being hidden and allows the operator to reliably operate an operation button image (here, the operation button image "Envelope").

Hardware Key Image HK

Figure 19:
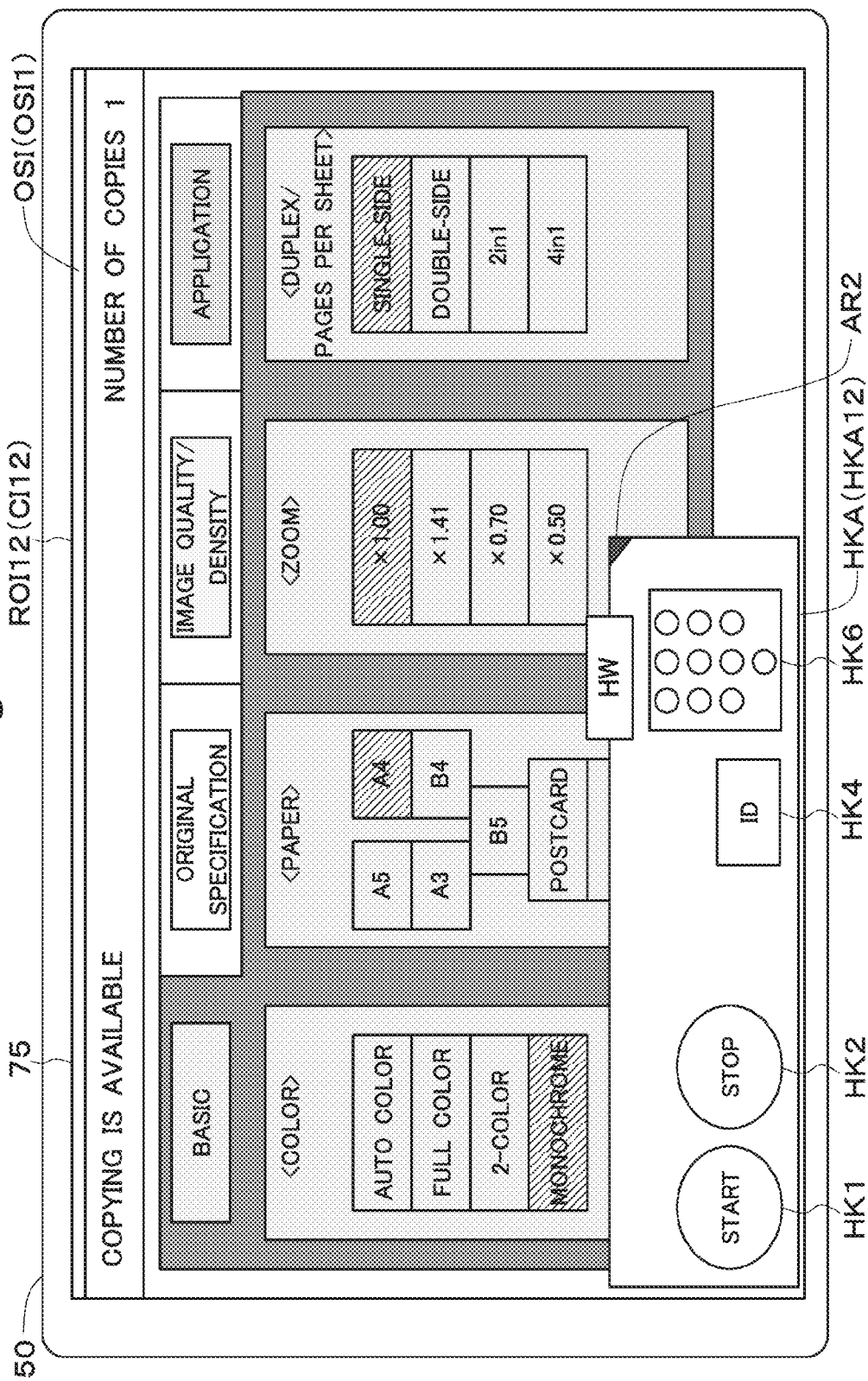
FIG. 19 illustrates a remote operation screen displayed on the external terminal according to a variation

While the above embodiment describes a case in which the hardware key area image HKA1 that display the eight hardware key images HK1 to HK8 corresponding to hardware keys is combined with the operation screen image OSI1 as shown in FIG. 11, the present invention is not limited to this example. For example, a hardware key area image HKA12 that displays a relatively small number (here, four, which is smaller than eight) of hardware key images HK1, HK2, HK4, and HK6 that correspond to some of the hardware keys corresponding to the hardware key images HK1 to HK8 may be combined with the operation screen image OSI1 as shown in FIG. 19. Note that the hardware key area image HKA12 may display some hardware key images HK with higher usage frequencies or may display hardware key images HK whose usage frequencies are higher than a predetermined threshold value.

Figure 18:
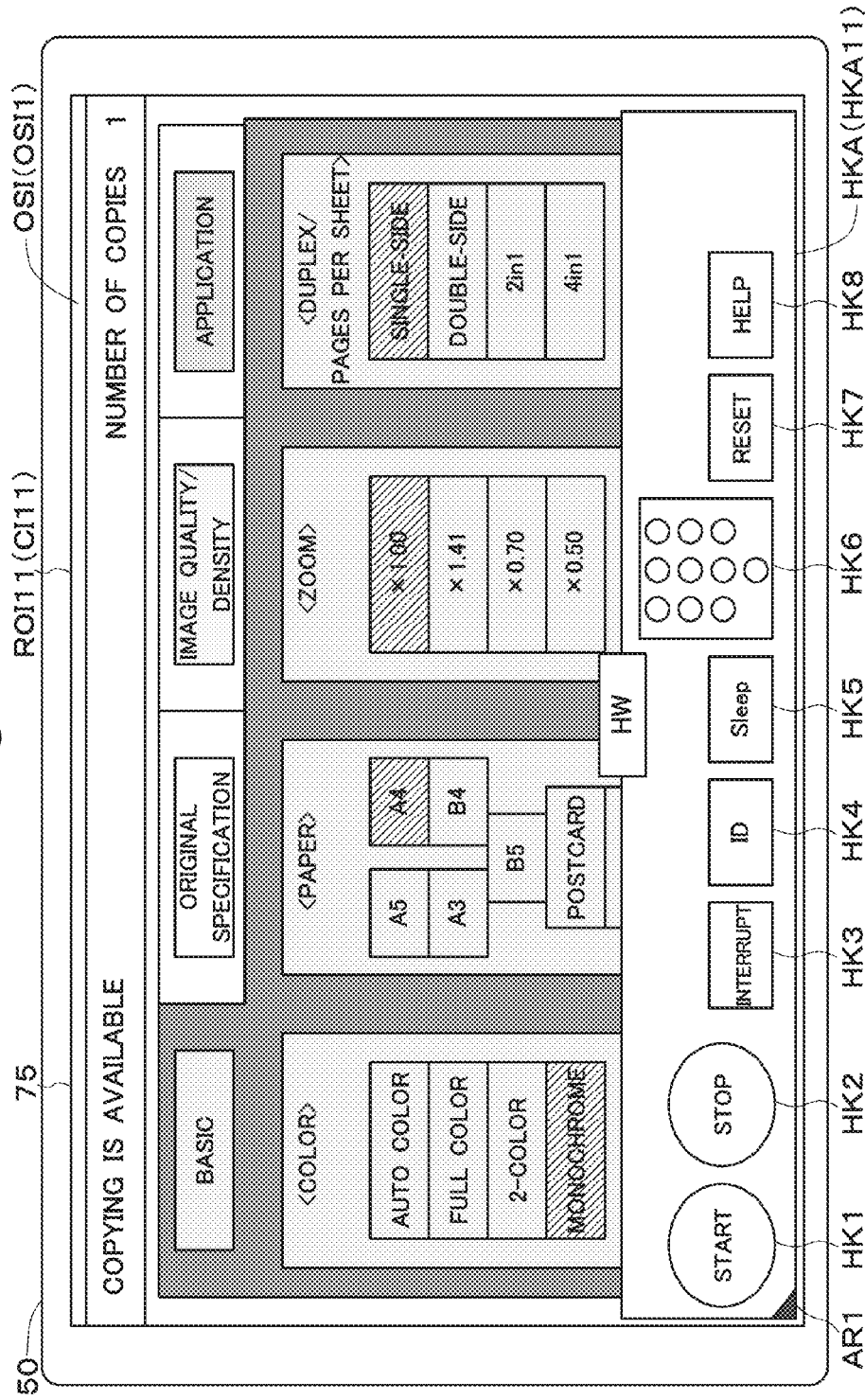
FIG. 18 illustrates a remote operation screen displayed on the external terminal according to a variation

While the above embodiment describes a case in which, when manual input to the call key image CK in the remote operation image ROI1 (see FIG. 10) is accepted, the hardware key area image HKA1 is combined so as to be arranged within the operation screen image OSI1 as shown in FIG. 11, the present invention is not limited to this example. For example, when manual input to the call key image CK in the remote operation image ROI1 (see FIG. 10) is accepted, a hardware key area image HKA11, which will be described later, may be combined so as to be arranged within the operation screen image OSI1 as shown in FIG. 18. Furthermore, display of the hardware key area image HKA11 (see FIG. 18) may be switched to display of a hardware key area image HKA12 (see FIG. 19), which will be described later.

Below is a detailed description of this variation.

According to the variation, in response to manual input to the call key image CK, a composite image CI11 generated by combining the hardware key area image HKA11 to be described next such that the hardware key area image HKA11 is arranged within the operation screen image OSI1 is first displayed as a remote operation image ROI11 as shown in FIG. 18 on the touch screen 75 of the external terminal 50.

The hardware key area image HKA11 is an image that includes a switching area AR1 in addition to the eight hardware key images HK1 to HK8. The switching area AR1 is an area for accepting a switching instruction to switch the hardware key area image HKA11 to the hardware key area image HKA12 (see FIG. 19). Here, the switching area AR1 is disposed in the lower left of the hardware key area image HKA11.

When manual input to the switching area AR1 is accepted in the remote operation image ROI11 shown in FIG. 18, the communication control unit 61 of the external terminal 50 transmits manual input information PJ on the manual input to the MFP 10.

When it is determined on the basis of the manual input information PJ that manual input to the switching area AR1 is accepted by the external terminal 50, the generation unit 13 of the MFP 10 generates a composite image CI12 by combining the hardware key area image HKA12 described later such that the hardware key area image HKA12 is arranged within the operation screen image OSI1 as shown in FIG. 19.

After this, the communication control unit 11 of the MFP 10 transmits image data DT12 that is image data of the composite image CI12 to the external terminal 50 as data for displaying a remote operation image ROI12.

In response to this transmission, the communication control unit 61 of the external terminal 50 receives the image data DT12. Then, the input/output control unit 65 of the external terminal 50 displays the composite image CI12 based on the image data DT12 as the remote operation image ROI12 on the touch panel 75.

The hardware key area image HKA12 is an image that includes a switching area AR2 in addition to the four hardware key images HK1, HK2, HK4, and HK6 as shown in FIG. 19. The switching area AR2 is an area for accepting a switching instruction to switch the hardware key area image HKA12 to the hardware key area image HKA11 (see FIG. 18). Here, the switching area AR2 is disposed in the upper right of the hardware key area image HKA12.

When manual input to the switching area AR2 is accepted in the remote operation image ROI12 shown in FIG. 19, the communication control unit 61 of the external terminal 50 transmits manual input information PJ on the manual input to the MFP 10.

When it is determined on the basis of the manual input information PJ that manual input to the switching area AR2 is accepted by the external terminal 50, the MFP 10 generates the composite image CI11 by combining the hardware key area image HKA11 such that the hardware key area image HKA11 is arranged within the operation screen image OSI1 as shown in FIG. 18.

After this, the communication control unit 11 of the MFP 10 transmits the image data DT11 that is image data of the composite image CI11 to the external terminal 50 as data for displaying the remote operation image ROI11.

In response to this transmission, the communication control unit 61 of the external terminal 50 receives the image data DT11. Then, the input/output control unit 65 of the external terminal 50 displays the composite image CI11 based on the image data DT11 once again as the remote operation image ROI11 on the touch panel 75.

As described above, according to the variation, switching between the hardware key area image HKA11 and the hardware key area image HKA12 is possible using the switching area AR1 in the hardware key area image HKA11 and the switching area AR2 in the hardware key area image HKA12.

Specification of Place to Arrange Call Key Image CK

While the above embodiment describes a case in which the call key image CK is combined with and displayed in the area of the operation screen image OSI1 in the vicinity of the lower side of the operation screen image OSI1, the present invention is not limited to this example. Alternatively, the call key image CK may be combined with and displayed in an area of the operation screen image OSI1 in the vicinity of one side of the operation screen image OSI1 specified as the place to arrange the call key image CK by an administrator SU.

Below is a detailed description of this variation. The variation assumes a situation in which the administrator SU of the MFP 10 sets the place to arrange the call key image CK or the like in advance via a setting screen SS3 (see FIG. 23), which will be described later.

Figure 20:
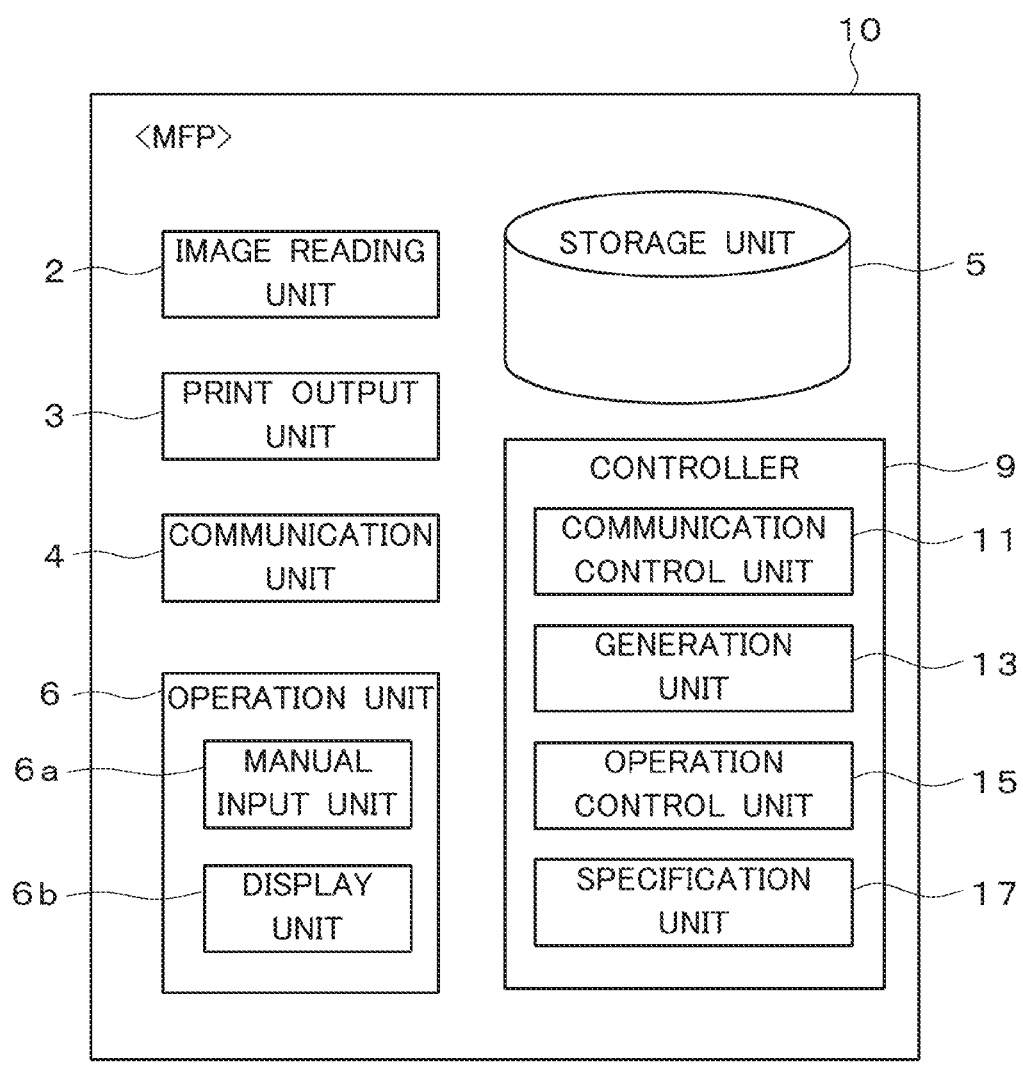
FIG. 20 is a functional block diagram of an image forming apparatus according to a variation.

According to the variation, the controller 19 includes a specification unit 17 as shown in FIG. 20 in addition to the processing units 11, 13, and 15 described in the above embodiments. The specification unit 17 is a processing unit configured to specify, for example, the place where the call key image CK is to be arranged in the operation screen image OSI1.

Figure 21:
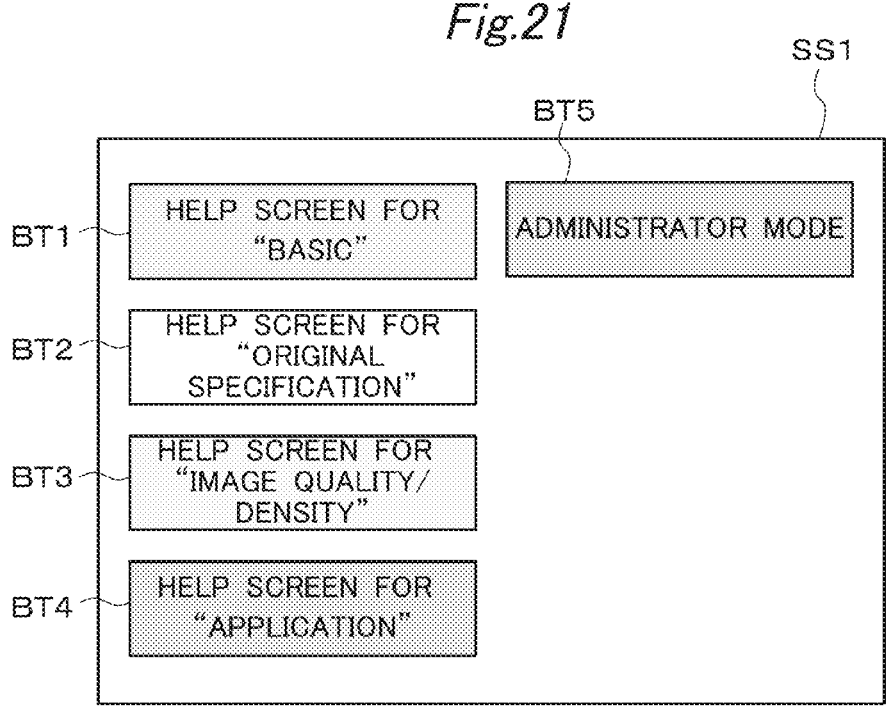
FIG. 21 illustrates an operation screen displayed on the image forming apparatus.

When manual input by the administrator SU of the MFP 10 to a hardware key KY ("HELP" key) provided externally of the touch screen 25 of the MFP 10 is accepted, the MFP 10 displays a setting screen (HELP screen) SS1 shown in FIG. 21 on the touch screen 25. The setting screen SS1 is configured by five buttons BT1 to BT5 (see FIG. 21). The buttons BT1 to BT4 are for calling various types of HELP screens, and the button BT5 is for calling an administrator screen.

Figure 22:
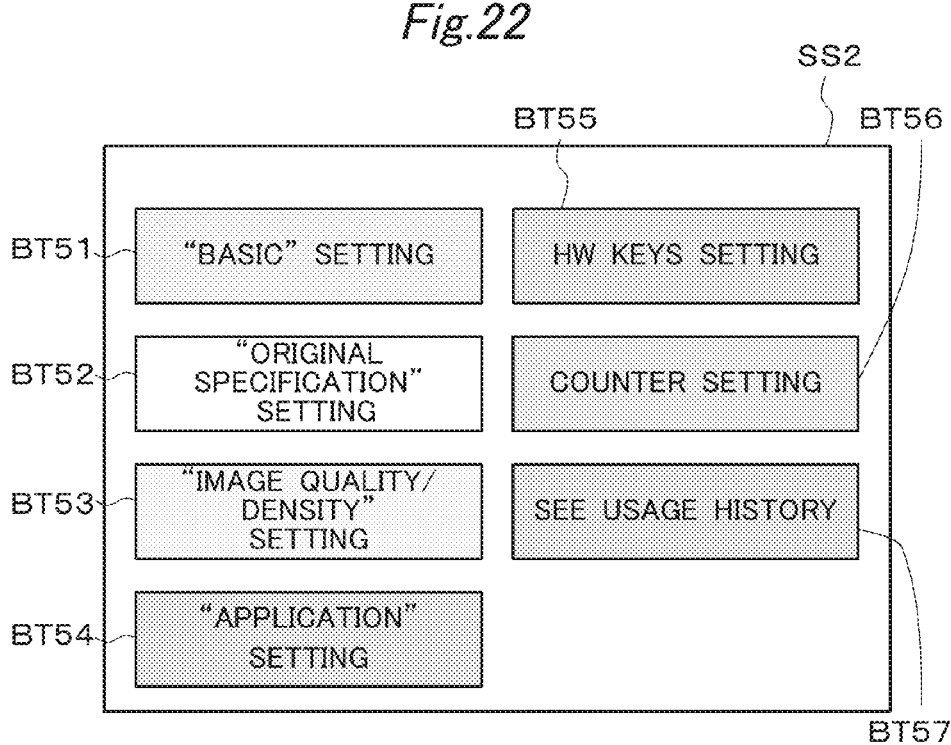
FIG. 22 illustrates an operation screen displayed on the image forming apparatus.

When the button BT5 in the setting screen SS1 has been pressed by an operator, the MFP 10 transitions to an administrator mode and displays a new setting screen (administrator screen) SS2 (see FIG. 22) on the touch screen 25. The setting screen SS2 is configured by multiple buttons BT51 to BT57 (see FIG. 22).

If the button BT55 in the setting screen SS2 has been pressed by the operator, the MFP 10 displays a new setting screen SS3 (see FIG. 23) on the touch screen 25. The setting screen SS3 is a setting screen for making various types of settings for the hardware key area image and is configured by buttons (buttons BT71 to BT74, buttons BT81 to BT83, and buttons BT91 and BT92) for setting the setting items ("Placement," "Shape," and "Display Mode") (see FIG. 23).

For example, if manual input to the button BT72 for setting the setting item "Placement" is accepted in the setting screen SS3, the place to arrange the call key image CK is set to an area of the operation screen image OSI1 in the vicinity of the right side of the operation screen image OSI1. Specifically, the place to arrange the call key image CK is specified via the button BT72 in the setting screen SS3. In this way, the button BT72 functions as part of the specification unit 17 of the MFP 10 that specifies the place to arrange the call key image CK.

If manual input to the button BT81 for the setting item "Shape" is accepted in the setting screen SS3, the shape of the call key image CK is set to "rectangular."

If manual input to the button BT91 for the setting item "Display Mode" is accepted in the setting screen SS3, the display mode of the hardware key area image HKA is set to "full display mode."

As described above, the place to arrange the call key image CK, the shape of the call key image CK, and the display mode of the hardware key area image HKA are appropriately set via the setting screen SS3.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming apparatus remotely operated by an external terminal, the image forming apparatus comprising a processor configured to:

generate a first composite image by combining a first image and a second image such that the second image is displayed within and over the first image, the first image being an operation screen image corresponding to an operation screen of the image forming apparatus, and the second image including a hardware key image corresponding to a hardware key of the image forming apparatus;

transmit first image data that is image data of the first composite image to the external terminal as data for displaying a remote operation image used for remote operation of the image forming apparatus; and receive first manual input information from the external terminal, the first manual input information being information on manual input to the first composite image displayed as the remote operation image on the external terminal, wherein the processor is further configured to generate a second composite image by combining a call key image for calling the second image with the first image such that the call key image is arranged within the first image, the processor is further configured to, prior to the transmission of the first image data, transmit second image data that is image data of the second composite image to the external terminal as data for displaying the remote operation image, the processor is further configured to receive second manual input information from the external terminal, the second manual input information being information on manual input to the second composite image displayed as the remote operation image on the external terminal, and the processor is further configured to, when it is determined on the basis of the second manual input information that manual input to the call key image in the second composite image is accepted, transmit the first image data to the external terminal as data for displaying the remote operation image.

2. The image forming apparatus according to claim 1, wherein the second composite image is an image generated by combining the call key image such that the call key image is arranged within an area in the vicinity of one side of upper, lower, right, and left sides of the first image.

3. The image forming apparatus according to claim 2, wherein the processor is further configured to specify a place where the call key image is to be arranged within the first image, and wherein the processor is further configured to generate the second composite image by combining the call key image such that the call key image is arranged within the area in the vicinity of the one side, the area being specified by the processor as the place to arrange the call key image.

4. The image forming apparatus according to claim 2, wherein the processor is further configured to, when it is determined on the basis of the second manual input information that manual input to the call key image is accepted by the external terminal, generate the first composite image by combining the first image and the second image such that the second image is displayed within and over the area in the vicinity of the one side.

5. The image forming apparatus according to claim 4, wherein the call key image has a shape indicating an orientation from the one side toward a side opposite the one side.

6. The image forming apparatus according to claim 1, wherein the first image includes an area in which an operation button image corresponding to an operation button provided in the operation screen is arranged, and an area in which the operation button image is not arranged, and the processor is further configured to generate the first composite image by combining the first image and the second image such that the second image is displayed within and over the area in which the operation button image is not arranged, in the first image.

7. The image forming apparatus according to claim 1, wherein the processor is further configured to use either a first hardware key area image or a second hardware key area image as the second image to generate the first composite image, the first hardware key area image displaying a predetermined number of hardware key images that correspond to a plurality of hardware keys of the image forming apparatus, and the second hardware key area image displaying a relatively smaller number of hardware key images that correspond to some of the plurality of hardware keys.

8. The image forming apparatus according to claim 7, wherein the first hardware key area image includes a first switching area for accepting a switching instruction to switch the first hardware key area image to the second hardware key area image, the second hardware key area image includes a second switching area for accepting a switching instruction to switch the second hardware key area image to the first hardware key area image, and the processor is further configured to:

when it is determined on the basis of the first manual input information that manual input to the first switching area is accepted by the external terminal, generate the first composite image by combining the first image and the second hardware key area image such that the second hardware key area image is displayed within and over the first image; and when it is determined on the basis of the first manual input information that manual input to the second switching area is accepted by the external terminal, generate the first composite image by combining the first image and the first hardware key area image such that the first hardware key area image is displayed within and over the first image.

9. The image forming apparatus according to claim 1, wherein the second image is an image of an area that includes a predetermined hardware key image corresponding to a hardware key group consisting of at least two hardware keys of the image forming apparatus, the processor is further configured to, when it is determined on the basis of the first manual input information that manual input to the predetermined hardware key image is accepted, generate a third composite image by combining the first composite image and an enlarged hardware key group image such that the enlarged hardware key group image is displayed within and over the first image, the enlarged hardware key group image being used for remote operation of the hardware key group and being larger than the predetermined hardware key image, and the processor is further configured to transmit third image data that is image data of the third composite image to the external terminal as data for displaying the remote operation image.

10. An image forming system comprising:

the image forming apparatus according to claim 1, the processor of the image forming apparatus being a first processor; and the external terminal, the external terminal being configured to remotely operate the image forming apparatus, the external terminal including a second processor configured to:

receive the first image data;

display the first composite image based on the first image data as the remote operation image on a display unit and accept manual input to the remote operation image; and transmit manual input information on the manual input to the remote operation image toward the image forming apparatus.

11. The image forming system according to claim 10, wherein the first processor is further configured to use either a first hardware key area image or a second hardware key area image as the second image to generate the first composite image, the first hardware key area image displaying a predetermined number of hardware key images that correspond to a plurality of hardware keys of the image forming apparatus, and the second hardware key area image displaying a relatively smaller number of hardware key images that correspond to some of the plurality of hardware keys.

12. The image forming system according to claim 11, wherein
the first hardware key area image includes a first switching area for accepting a switching instruction to switch the first hardware key area image to the second hardware key area image,
the second hardware key area image includes a second switching area for accepting a switching instruction to switch the second hardware key area image to the first hardware key area image, and
the first-processor is further configured to:
when it is determined on the basis of the first manual input information that manual input to the first switching area is accepted by the external terminal, generate the first composite image by combining the first image and the second hardware key area image such that the second hardware key area image is displayed within and over the first image; and
when it is determined on the basis of the first manual input information that manual input to the second switching area is accepted by the external terminal, generate the first composite image by combining the first image and the first hardware key area image such that the first hardware key area image is displayed within and over the first image.

13. The image forming system according to claim 10, wherein
the second image is an image of an area that includes a predetermined hardware key image corresponding to a hardware key group consisting of at least two hardware keys of the image forming apparatus,
the first processor is further configured to, when it is determined on the basis of the first manual input information that manual input to the predetermined hardware key image is accepted, generate a third composite image by combining the first composite image and an enlarged hardware key group image such that the enlarged hardware key group image is displayed within and over the first image, the enlarged hardware key group image being used for remote operation of the hardware key group and being larger than the predetermined hardware key image, and
the first processor is further configured to transmit third image data that is image data of the third composite image to the external terminal as data for displaying the remote operation image.

14. A control method for controlling an image forming apparatus remotely operated by an external terminal, the method comprising the steps of:
a) generating a first composite image by combining a first image and a second image such that the second image is displayed within and over the first image, the first image being an operation screen image corresponding to an operation screen of the image forming apparatus, and the second image including a hardware key image corresponding to a hardware key of the image forming apparatus;
b) transmitting first image data that is image data of the first composite image to the external terminal as data for displaying a remote operation image used for remote operation of the image forming apparatus;
c) receiving first manual input information from the external terminal, the first manual input information being information on manual input to the first composite image displayed as the remote operation image on the external terminal;
d) prior to the step b), generating a second composite image by combining a call key image for calling the second image with the first image such that the call key image is arranged within the first image;
e) prior to the step b), transmitting second image data that is image data of the second composite image to the external terminal as data for displaying the remote operation image; and
f) prior to the step b), receiving second manual input information from the external terminal, the second manual input information being information on manual input to the second composite image displayed as the remote operation image on the external terminal,
wherein, in the step b), when it is determined on the basis of the second manual input information that manual input to the call key image in the second composite image is accepted, the first image data is transmitted to the external terminal as data for displaying the remote operation image.

15. A non-transitory computer-readable recording medium that is encoded with a program for causing a computer built into an image forming apparatus remotely operated by an external terminal to execute the method according to claim 14.

16. The non-transitory computer-readable recording medium according to claim 15, wherein the program further causes the computer to execute the steps of:
using either a first hardware key area image or a second hardware key area image as the second image to generate the first composite image, the first hardware key area image displaying a predetermined number of hardware key images that correspond to a plurality of hardware keys of the image forming apparatus, and the second hardware key area image displaying a relatively smaller number of hardware key images that correspond to some of the plurality of hardware keys.

17. The non-transitory computer-readable recording medium according to claim 16, wherein
the first hardware key area image includes a first switching area for accepting a switching instruction to switch the first hardware key area image to the second hardware key area image,
the second hardware key area image includes a second switching area for accepting a switching instruction to switch the second hardware key area image to the first hardware key area image, and
the program further causes the computer to execute the steps of:
when it is determined on the basis of the first manual input information that manual input to the first switching area is accepted by the external terminal, generating the first composite image by combining the first image and the second hardware key area image such that the second hardware key area image is displayed within and over the first image; and
when it is determined on the basis of the first manual input information that manual input to the second switching area is accepted by the external terminal, generating the first composite image by combining the first image and the first hardware key area image such that the first hardware key area image is displayed within and over the first image.

18. The non-transitory computer-readable recording medium according to claim 15, wherein the second image is an image of an area that includes a predetermined hardware key image corresponding to a hardware key group consisting of at least two hardware keys of the image forming apparatus, and the program further causes the computer to execute the steps of:

when it is determined on the basis of the first manual input information that manual input to the predetermined hardware key image is accepted, generating a third composite image by combining the first composite image and an enlarged hardware key group image such that the enlarged hardware key group image is displayed within and over the first image, the enlarged hardware key group image being used for remote operation of the hardware key group and being larger than the predetermined hardware key image, and transmitting third image data that is image data of the third composite image to the external terminal as data for displaying the remote operation image.

19. The control method according to claim 14, further comprising:

using either a first hardware key area image or a second hardware key area image as the second image to generate the first composite image, the first hardware key area image displaying a predetermined number of hardware key images that correspond to a plurality of hardware keys of the image forming apparatus, and the second hardware key area image displaying a relatively smaller number of hardware key images that correspond to some of the plurality of hardware keys.

20. The control method according to claim 19, wherein the first hardware key area image includes a first switching area for accepting a switching instruction to switch the first hardware key area image to the second hardware key area image, the second hardware key area image includes a second switching area for accepting a switching instruction to switch the second hardware key area image to the first hardware key area image, and further comprising:

when it is determined on the basis of the first manual input information that manual input to the first switching area is accepted by the external terminal, generating the first composite image by combining the first image and the second hardware key area image such that the second hardware key area image is displayed within and over the first image; and when it is determined on the basis of the first manual input information that manual input to the second switching area is accepted by the external terminal, generating the first composite image by combining the first image and the first hardware key area image such that the first hardware key area image is displayed within and over the first image.

21. The control method according to claim 14, wherein the second image is an image of an area that includes a predetermined hardware key image corresponding to a hardware key group consisting of at least two hardware keys of the image forming apparatus, and further comprising:

when it is determined on the basis of the first manual input information that manual input to the predetermined hardware key image is accepted, generating a third composite image by combining the first composite image and an enlarged hardware key group image such that the enlarged hardware key group image is displayed within and over the first image, the enlarged hardware key group image being used for remote operation of the hardware key group and being larger than the predetermined hardware key image, and transmitting third image data that is image data of the third composite image to the external terminal as data for displaying the remote operation image.

22. An image forming apparatus remotely operated by an external terminal, the image forming apparatus comprising a processor configured to:

generate a first composite image by combining a first image and a second image such that the second image is displayed within and over the first image;

the first image being an operation screen image corresponding to an operation screen of the image forming apparatus, and the second image including a hardware key image for accepting manual input relating to an image forming process;

generate a second composite image by combining a call key image for calling the second image with the first image such that the call key image is arranged within the first image;

receive manual input information that is information on manual input to the second composite image displayed at the external terminal; and when it is determined on the basis of the manual input information that manual input to the call key image in the second composite image is accepted, cause the first composite image to be displayed at the external terminal.

23. An image forming system comprising:

an image forming apparatus according to claim 22; and the external terminal, the external terminal being configured to remotely operate the image forming apparatus, the external terminal including a second processor configured to:

receive and cause to display the second composite image generated by the image forming apparatus;

transmit to the image forming apparatus the manual input information that is information on manual input to the second composite image; and receive and cause to display the first composite image generated by the image forming apparatus.

24. A control method for controlling an image forming apparatus remotely operated by an external terminal, the method comprising the steps of:

a) generating a first composite image by combining a first image and a second image such that the second image is displayed within and over the first image, the first image being an operation screen image corresponding to an operation screen of the image forming apparatus, and the second image including a hardware key image for accepting manual input relating to an image forming process;

b) generating a second composite image by combining a call key image for calling the second image with the first image such that the call key image is arranged within the first image;

c) receiving manual input information that is information on manual input to the second composite image displayed at the external terminal; and d) when it is determined on the basis of the manual input information that manual input to the call key image in the second composite image is accepted, causing the first composite image to be displayed at the external terminal.

25. A non-transitory computer-readable recording medium that is encoded with a program for causing a computer built into an image forming apparatus remotely operated by an external terminal to execute the method according to claim 24.

* * * * *